(12) United States Patent
Kim et al.

(10) Patent No.: US 10,801,864 B2
(45) Date of Patent: Oct. 13, 2020

(54) ABSOLUTE POSITION MEASURING METHOD, ABSOLUTE POSITION MEASURING APPARATUS, AND COLOUR SCALE COMPRISING PLURAL SYMBOLS EACH WITH PLURAL SEGMENTS OF DIFFERENT COLOR PATTERNS

(71) Applicant: KOREA RESEARCH INSTITUTE OF STANDARDS AND SCIENCE, Daejeon (KR)

(72) Inventors: Jong-Ahn Kim, Daejeon (KR); Jae-Wan Kim, Daejeon (KR); Jae-Yong Lee, Cheongju-si (KR); Jonghan Jin, Daejeon (KR); Jae-Heun Woo, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 102 days.

(21) Appl. No.: 16/242,788

(22) Filed: Jan. 8, 2019

(65) Prior Publication Data

US 2019/0250013 A1    Aug. 15, 2019

(51) Int. Cl.
    *G01D 5/347* (2006.01)
(52) U.S. Cl.
    CPC ..... *G01D 5/34715* (2013.01); *G01D 5/34776* (2013.01); *G01D 5/34792* (2013.01)
(58) Field of Classification Search
    CPC .......... G01D 5/34715; G01D 5/34776; G01D 5/34792
    USPC ............................................. 250/231.13, 239
    See application file for complete search history.

(56) References Cited

U.S. PATENT DOCUMENTS 5,068,529 A * 11/1991 Ohno ................... G01D 5/2492
                                                  250/231.18

FOREIGN PATENT DOCUMENTS

JP         201085158 A    4/2010
KR         10328996 B1   11/2013

OTHER PUBLICATIONS

Office Action dated Mar. 4, 2019 for Korean Patent Application No. 10-2018-0017961; 7 pgs. Korean Intelectual Property Office, Republic of Korea.
Nakayama Toru; "Photoelectric Encoder, and Double Encoder System Using Photoelectric Encoder"; Bibliographic Data of JP2010085158 (A); Apr. 15, 2010; http://worldwide.espace.com.
Jong Ahn Kim et al; "Absolute Position Measuring Method, Absolute Position Measuring Apparatus, and Binary Scale"; Bibliographic Data of KR101328996 (B1); Oct. 13, 2013; http://worldwide.espace.com.

* cited by examiner

*Primary Examiner* — Que Tan Le
(74) *Attorney, Agent, or Firm* — Andrew D. Fortney; Central California IP Group, P.C.

(57) ABSTRACT

Provided is an absolute position color scale disposed to represent a binary code using a first symbol, having a first width and representing a first state ("HIGH"), and a second symbol having the first width and representing a second state ("LOW"). Each of the first and second symbols is divided into two or more segments having the same structure, and the first symbol has the same shape as the second symbol, but has a color pattern different from a color pattern of the symbol.

14 Claims, 24 Drawing Sheets

Absolute Position Code

| Binary | Decimal |
|--------|---------|
| 001 | 1 |
| 011 | 3 |
| 111 | 7 |
| 110 | 6 |
| 101 | 5 |
| 010 | 2 |
| 100 | 4 |

Look-Up Table

| Address (Decimal) | Absolute Position Value |
|-------------------|------------------------|
| 1 | 0 |
| 2 | 5 |
| 3 | 1 |
| 4 | 6 |
| 5 | 4 |
| 6 | 3 |
| 7 | 2 |

ABSOLUTE POSITION MEASURING METHOD, ABSOLUTE POSITION MEASURING APPARATUS, AND COLOUR SCALE COMPRISING PLURAL SYMBOLS EACH WITH PLURAL SEGMENTS OF DIFFERENT COLOR PATTERNS

CROSS-REFERENCE TO RELATED APPLICATIONS

This U.S. non-provisional patent application claims priority under 35 U.S.C. § 119 to Korean Patent Application No. 10-2018-0017961, filed on Feb. 13, 2018, in the Korean Intellectual Property Office, the entire contents of which are hereby incorporated by reference.

TECHNICAL FIELD

The present disclosure relates to a method of calculating an approximate position by reading a color scale pattern obtained by symbolizing a binary code and calculating an accurate absolute position using a phase of the color scale pattern.

BACKGROUND

An absolute position encoder, allowing a reading head to determine an absolute position using an absolute position scale, is known. Such an absolute encoder includes a scale with a single track having unique position data which are continuously generated along a measuring dimension of the scale. However, such an absolute position encoder has difficulty in providing an accurate position due to a resolution limitation of unique data.

In addition, an incremental position encoder is a device for measuring relative positions of two objects. An incremental scale encoder may recognize the same patterns arranged at regular intervals to provide accurate relative positions thereof. However, the incremental position encoder cannot provide an absolute position.

Accordingly, there is a need for an encoder providing both an absolute position and an accurate position.

SUMMARY

Example embodiments of the present disclosure provide an absolute position encoder capable of finding an absolute position.

According to an aspect of the present disclosure, an absolute position color scale is disposed to represent a binary code using a first symbol, having a first width and representing a first state ("HIGH"), and a second symbol having the first width and representing a second state ("LOW"). Each of the first and second symbols is divided into two or more segments having the same structure, and the first symbol has the same shape as the second symbol, but has a color pattern different from a color pattern of the second symbol.

In an example embodiment, the first symbol may include a second segment having a first color, the first symbol may include a first segment having a second color, the second symbol may include a first segment having the second color, and the second symbol may include a second segment having a black color.

In an example embodiment, each of the first and second symbols may include two segments.

In an example embodiment, each of the first and second symbols may include two segments, the first symbol may include a first segment having a composite color of a first color and a second color, the first symbol may include a second segment having a black color, the second symbol may include a first segment having the second color, and the second symbol may include a second segment having the first color.

In an example embodiment, each of the first and second symbols may include four segments, the first symbol may include first and second segments each having a first color, the first symbol may include a third segment having a composite color of the first color and a second color, the first symbol may include a fourth segment having the second color, the second symbol may include first and second segments each having a black color, and the second symbol may include third and fourth segments each having the second color.

In an example embodiment, each of the first and second symbols may include four segments, the first symbol may include a first segment having a first color, the first symbol may include a second segment having a composite color of the first color and a second color, the first symbol may include a third segment having the second color, the first symbol may include a fourth segment having a black color, the second symbol may include a first segment having the black color, the second symbol may include a second segment having the second color, the second symbol may include a third segment having a composite color of the first color and the second color, and the second symbol may include a fourth segment having the first color.

According to another aspect of the present disclosure, an absolute position color scale is disposed to represent a binary code using a first symbol, having a first width and representing a first state ("HIGH"), and a second symbol having the first width and representing a second state ("LOW"). Each of the first and second symbols is divided into two or more segments having the same structure. The first symbol is formed by color composition of a first absolute position symbol and an incremental position symbol having the same structure. The second symbol is formed by color composition of a second absolute position symbol and the incremental position symbol having the same structure. A first absolute position symbol and a second absolute position symbol represent the first state ("HIGH") or the second state ("LOW") using a black color and a first color, and the incremental position symbol includes the black color and a second color.

In an example embodiment, each of the first and second symbols may include two segments, the first absolute position symbol may include a first segment having the black color, the first absolute position symbol may include a second segment having the first color, the second absolute position symbol may include a first segment having the black color, the second absolute position symbol may include a second segment having the black color, the incremental position symbol may include a first segment having the second color, and the incremental position symbol may include a second segment having the black color.

In an example embodiment, each of the first and second symbols may include two segments, the first absolute position symbol may include a first segment having the first color, the first absolute position symbol may include a second segment having the black color, the second absolute position symbol may include a first segment having the black color, the second absolute position symbol may include a second segment having the first color, the incremental position symbol may include a first segment having the second color, and the incremental position symbol may include a second segment having the black color.

In an example embodiment, each of the first and second symbols may include four segments, the first absolute position symbol may include first to third segments each having the first color, the first absolute position symbol include a fourth segment having the first color, the second absolute position symbol may include first to fourth segments each having the black color, the incremental position symbol may include first and second segments each having the black color, and the incremental position symbol may include third and fourth segments each having the second color.

In an example embodiment, each of the first and second symbols may include four segments, the first absolute position symbol may include first and second segments each having the first color, the first absolute position symbol may include third and fourth segments each having the black color, the second absolute position symbol may include first and second segments each having the black color, the second absolute position symbol may include third and fourth segments each having the first color, the incremental position symbol may include first and fourth segments each having the black color, and the incremental position symbol may include second and third segments each having the second color.

According to another aspect of the present disclosure, a two-dimensional color scale is disposed to represent a binary code using first to fourth symbols each including 2×2 segments. The first symbol represents a first state in a first direction and a first state in a second direction, the second symbol represents a second state in the first direction and a first state in the second direction, the third symbol represents a first state in a first direction and a second state in a second direction, the fourth symbol represents a second state in a first direction and a second state in a second direction, and the first to fourth symbols have a first color and a second color and include different color patterns to each other.

In an example embodiment, the first symbol may include a first segment of a (1,1) coordinate having the first color, the first symbol may include a second segment of a (1,2) coordinate having the second color, the first symbol may include a third segment of a (2,1) coordinate having the second color, the first symbol may include a fourth segment of a (2,2) coordinate having a black color, the second symbol may include a first segment of a (1,1) coordinate having the first color, the second symbol may include a second segment of a (1,2) coordinate having the black color, the second symbol may include a third segment of a (2,1) coordinate having the second color, the second symbol may include a fourth segment of a (2,2) coordinate having the black color, the third symbol may include a first segment of a (1,1) coordinate having the first color, the third symbol may include a second segment of a (1,2) coordinate having the second color, the third symbol may include a third segment of a (2,1) coordinate having the black color, the third symbol may include a fourth segment of a (2,2) coordinate having the black color, the fourth symbol may include a first segment of a (1,1) coordinate having the first color, the fourth symbol may include a second segment of a (1,2) coordinate having the black color, the fourth symbol may include a third segment of a (2,1) coordinate having the black color, and the fourth symbol may include a fourth segment of a (2,2) coordinate having the black color, In an example embodiment, the first symbol may include a first segment of a (1,1) coordinate having a composite color of the first color and the second color, the first symbol may include a second segment of a (1,2) coordinate having a black color, the first symbol may include a third segment of a (2,1) coordinate having the black color, the first symbol may include a fourth segment of a (2,2) coordinate having the black color, the second symbol may include a first segment of a (1,1) coordinate having a composite color of the first color and the second color, the second symbol may include a second segment of a (1,2) coordinate having the second color, the second symbol may include a third segment of a (2,1) coordinate having the black color, the second symbol may include a fourth segment of a (2,2) coordinate having the black color, the third symbol may include a first segment of a (1,1) coordinate having a composite color of the first color and the second color, the third symbol may include a second segment of a (1,2) coordinate having the black color, the third symbol may include a third segment of a (2,1) coordinate having the second color, the third symbol may include a fourth segment of a (2,2) coordinate having the black color, the fourth symbol may include a first segment of a (1,1) coordinate having the first color, the fourth symbol may include a second segment of a (1,2) coordinate having the second color, the fourth symbol may include a third segment of a (2,1) coordinate having the second color, and the fourth symbol may include a fourth segment of a (2,2) coordinate having the black color.

In an example embodiment, the first color is one of the three primary colors, and the second color is another one of the three primary colors.

According to another aspect of the present disclosure, a method of reading a position of a color scale includes obtaining a color image for a color scale formed through color composition of an absolute position pattern including a first color and an incremental position pattern including a second color, separating the color image by color to generate a first color channel signal including an absolute position pattern including the first color and a second color channel signal including an incremental position pattern including the second color, and reading an absolute position codeword at a specific position from the first color channel signal to determine an approximate absolute position.

In an example embodiment, the method may further include determining a phase value and a detailed relative position at a specific position using the second color channel signal corresponding to the incremental position pattern and calculating a detailed absolute position using the approximate absolute position and the detailed relative position.

In an example embodiment, the reading an absolute position codeword at a specific position from the first color channel signal to determine an approximate absolute position may include reading a codeword of an absolute position from the first color channel signal using a signal level at the specific position, calculating an absolute position value using a look-up table corresponding to the codeword of the absolute position, and calculating an approximate absolute position using the absolute position value.

In an example embodiment, the determining a phase value and a detailed relative position at a specific position using the second color channel signal corresponding to the incremental position pattern may include Fourier-transforming the second color channel signal into a spatial frequency region to calculate a Fourier spectrum, filtering the Fourier spectrum to extract a positive spatial frequency component, inversely Fourier-transforming a positive spatial frequency component into a position space to calculate a phase, detecting a phase discontinuity position in the phase to perform phase unwrapping, and calculating a phase value at a specific position.

In an example embodiment, the absolute position pattern may be colored in the first color at a position, representing a first state, in a binary code representing an absolute position, and the incremental position pattern may be periodically colored in a second color.

In an example embodiment, the incremental position pattern may be periodically colored in a first color, and the absolute position pattern may be colored in a second color at different positions according to a first state and a second state in a binary code representing an absolute position.

According to another aspect of the present disclosure, a method of determining a two-dimensional color scale position may include obtaining a color image for a two-dimensional color scale pattern formed through color composition of a two-dimensional absolute position pattern including a first color and a two-dimensional incremental position pattern including a second color, separating the color image by color to generate a first color channel image including a two-dimensional absolute position pattern including the first color and a second color channel image including a two-dimensional incremental position pattern including the second color, determining a first phase value in a first direction, a second phase value in a second direction, a first detailed relative position in the first direction, and a second detailed relative position in the second direction at a specific position using a second color channel image corresponding to the two-dimensional incremental position pattern, reading a first absolute position codeword from the first color channel image at the specific position in the first direction to determine a first approximate absolute position and reading a second absolute position codeword the from the first color channel image at the specific position in the second direction to determine a second approximate absolute position in the second direction, and calculating a first detailed absolute position using the first approximate absolute position and the first detailed relative position and calculating a second detailed absolute position using the second approximate absolute position and the second detailed relative position.

In an example embodiment, the reading a first absolute position codeword from the first color channel image at the specific position in the first direction to determine a first approximate absolute position and reading a second absolute position codeword from the first color channel image at the specific position in the second direction to determine a second approximate absolute position in the second direction may include reading a codeword of a first absolute position from the first color channel image the specific position using a signal level in a first direction, calculating a first absolute position value using a look-up table corresponding the codeword of the first absolute position in the first direction, calculating a first approximate absolute position using the first absolute position value, reading a codeword of a second absolute position from the first color channel image at the specific position using a signal level in a second direction, calculating a second absolute position value using a look-up table corresponding to the codeword of the second absolute position in the second direction, and calculating a second approximate absolute position using the second absolute position value.

In an example embodiment, the determining a first phase value in a first direction, a second phase value in a second direction, a first detailed relative position in the first direction, and a second detailed relative position in the second direction at a specific position using a second color channel image corresponding to the two-dimensional incremental position pattern may include generating a second color channel signal in a first direction in the second color channel image, Fourier-transforming the second color channel signal in the first direction into a spatial frequency region to calculate a Fourier spectrum in the first direction, filtering the Fourier spectrum in the first direction to extract a positive spatial frequency component in the first direction, inversely Fourier-transforming the positive spatial frequency component in the first direction, detecting a phase discontinuity position in the first phase to perform phase unwrapping, calculating a first phase value at a specific position, generating a second color channel signal in a second direction in the second color channel image, Fourier-transforming a second color channel signal in the second direction into a spatial frequency region to calculate a Fourier spectrum in the second direction, filtering the Fourier spectrum in the second direction to extract a spatial frequency component in the second direction, inversely Fourier-transforming a positive spatial frequency component in the second direction into a position space to calculate a second phase, detecting a phase discontinuity position in the second phase to perform phase unwrapping, and calculating a second phase value at a specific position.

In an example embodiment, the two-dimensional color scale may be disposed to represent a binary code using first to fourth symbols each including 2×2 segments, the first symbol may include a first segment of a (1,1) coordinate having the first color, the first symbol may include a second segment of a (1,2) coordinate having the second color, the first symbol may include a third segment of a (2,1) coordinate having the second color, the first symbol may include a fourth segment of a (2,2) coordinate having a black color, the second symbol may include a first segment of a (1,1) coordinate having the first color, the second symbol may include a second segment of a (1,2) coordinate having the black color, the second symbol may include a third segment of a (2,1) coordinate having the second color, the second symbol may include a fourth segment of a (2,2) coordinate having the black color, the third symbol may include a first segment of a (1,1) coordinate having the first color, the third symbol may include a second segment of a (1,2) coordinate having the second color, the third symbol may include a third segment of a (2,1) coordinate having the black color, the third symbol may include a fourth segment of a (2,2) coordinate having the black color, the fourth symbol may include a first segment of a (1,1) coordinate having the first color, the fourth symbol may include a second segment of a (1,2) coordinate having the black color, the fourth symbol may include a third segment of a (2,1) coordinate having the black color, and the fourth symbol may include a fourth segment of a (2,2) coordinate having the black color.

In an example embodiment, the two-dimensional color scale may be disposed to represent a binary code using first to fourth symbols each including 2×2 segments, the first symbol may include a first segment of a (1,1) coordinate having a composite color of the first color and the second color, the first symbol may include a second segment of a (1,2) coordinate having a black color, the first symbol may include a third segment of a (2,1) coordinate having the black color, the first symbol may include a fourth segment of a (2,2) coordinate having the black color, the second symbol may include a first segment of a (1,1) coordinate having a composite color of the first color and the second color, the second symbol may include a second segment of a (1,2) coordinate having the second color, the second symbol may include a third segment of a (2,1) coordinate having the black color, the second symbol may include a fourth segment of a (2,2) coordinate having the black color, the third symbol may include a first segment of a (1,1)

coordinate having a composite color of the first color and the second color, the third symbol may include a second segment of a (1,2) coordinate having the black color, the third symbol may include a third segment of a (2,1) coordinate having the second color, the third symbol may include a fourth segment of a (2,2) coordinate having the black color, the fourth symbol may include a first segment of a (1,1) coordinate having the first color, the fourth symbol may include a second segment of a (1,2) coordinate having the second color, the fourth symbol may include a third segment of a (2,1) coordinate having the second color, and the fourth symbol may include a fourth segment of a (2,2) coordinate having the black color.

According to another aspect of the present disclosure, an absolute position measuring apparatus may include a color scale disposed to represent a binary code using a first symbol, having a first width and representing a first state ("HIGH"), and a second symbol having the first width and representing a second state ("LOW"), a light source configured to irradiate a light to the color scale, an optical system configured to focus a light passing through the color scale or a light reflected from the color scale, a photo-sensor array configured to sense an image of the color scale. Each of the first and second symbols is divided into two or more segments having the same structure, and the first symbol has the same shape as the second symbol, but has a color pattern different from a color pattern of the second symbol.

In an example embodiment, the optical system may include an object lens unit configured to irradiate an output light of the light source to the color scale and an image lens unit configured to focus a light, passing through the object lens after being reflected from the color scale, on the photo-sensor array.

In an example embodiment, the absolute position measuring apparatus may further include a collimator lens configured to convert a light of the light source into a parallel light and a beam splitter configured to provide a light to the object lens after changing an optical path of the parallel light and to provide the light provided to the object lens unit to the image lens unit.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
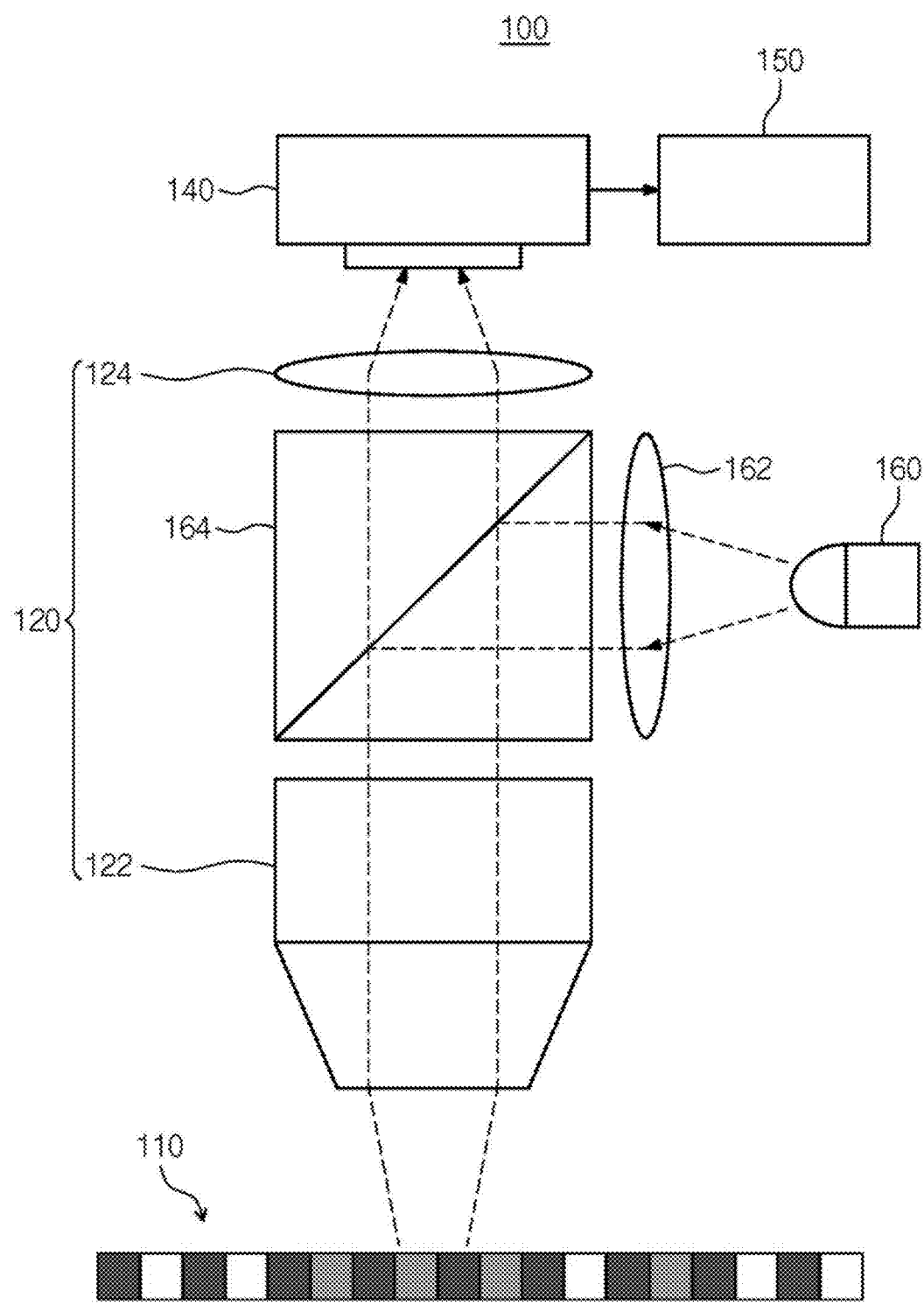
FIG. 1 illustrates an absolute position measuring apparatus according to an example embodiment of the present disclosure.

A color system is a three-dimensionally expressed spatial concept, and all colors of the color system are shown in the color space by three-dimensional coordinates.

An RGB color space shows colors in an additive color mixture manner in which brightness is increased by mixing colors. Three primary colors of RGB additive mixture refer to red, green, and blue. An RGB color space specifies colors based on the brightness of three channels corresponding to the three primary colors. The RGB color space is a basic principle of color expression.

The three primary colors show different colors when they are additively mixed with each other. When a color image sensor captures an object having a specific color, data of a red pixel, data of a green pixel, and data of a blue pixel may be composed to show the specific color. That is, the red pixel, the green pixel, and the blue pixel of the color image sensor may independently decompose the specific color into a red component, a green component, and a blue component, respectively.

For example, an absolute position scale may encode absolute position information in black and green, and the incremental position scale may encode position information in black and red. After the absolute position scale and the incremental position scale overlap each other, a color-composed composite color scale of light may be prepared. The color image sensor may capture the composite color scale, and a processor may read an absolute position pattern formed by green pixels and may read an incremental position pattern formed by red filters. Accordingly, a precise absolute position may be determined by combining an absolute position and an incremental position.

In the case in which a composed color scale includes absolute position information encoded with one of the colors red, green, and blue and relative position information encoded with another color, the color image sensor may be encoded with one color and another color information may be extracted independently.

An absolute position is encoded by an absolute position pattern using black and a first color, and a relative position is encoded by the same incremental position patterns, arranged at regular intervals, using black and a second color. The composed color scale can be formed by color composition of the absolute position pattern and the incremental position pattern.

The binary code, encoding an absolute position, may be a pseudo-random-code. The pseudo-random-code is generated using a shift register. A maximum length sequence is a sequence, having a maximum length period, among sequences which may be generated using transition registers of given N stages. For example, in the case of three stages, a maximum code length is 7 and a period of a maximum length sequence is 9. In the case of four stages, a maximum code length is 15 and a period of a maximum length sequence is 18. In the case of 12 stages, a maximum code length is 4095 and a period of a maximum length sequence is 4106. An absolute position corresponding to a maximum code length may be shown. For example, in the case of three stages, the maximum length sequence may be "001110100".

Values of N registers may constitute a codeword, and the codeword may represent an absolute position. Pseudo-random-code may be variously modified. Conventionally, a color scale pattern may include a maximum length sequence or a Gold sequence including ten or more stages. For ease of description, a color scale using pseudorandom-code generated by transition registers including three stages will be described.

The pseudo-random-code need to include a specific pattern or symbol to be applied to a color scale pattern. When the pseudo-random-code is applied to the color scale pattern, the pseudo-random-code may provide a coarse absolute position. The color scale pattern uses a predetermined symbol to specify an accurate position using a phase of the pseudo-random-code.

Specifically, the color scale pattern is formed to replace pseudo-random-codes repeatedly arranged with a sequence of N stages of linear feedback shift registers. A value of the sequence is replaced with a first symbol or a second symbol.

Accordingly, a color scale pattern, having a length greater than or equal to a length of a code word, needs to be read to know an absolute position. The color scale pattern may be repeatedly arranged with a unit length d. The codeword is determined by a value of the transition register of the N stage.

Example embodiments of the present disclosure will now be described below more fully with reference to accompanying drawings. The present disclosure may, however, be embodied in different forms and should not be constructed as limited to the embodiments set forth herein. Rather, these embodiments are provided so that this disclosure will be thorough and complete, and will fully convey the scope of the present invention to those skilled in the art.

Reference numerals are indicated in detail in example embodiments of the present disclosure, and their examples are represented in reference drawings. In every possible case, like reference numerals are used for referring to the same or similar elements in the description and drawings.

FIG. 1 illustrates an absolute position measuring apparatus according to an example embodiment of the present disclosure.

Referring to FIG. 1, it will be assumed that a single track binary code is generated with a reflective mask and that an absolute position is calculated by analyzing a color intensity profile of a reflected color image of the single track binary code. A color scale 110 includes a color scale pattern 112 formed on a surface thereof.

Accordingly, we should obtain a color intensity profile of a reflected color image for data processing. An absolute position measuring apparatus 100 for obtaining the intensity profile may include a color scale 110, an optical system 120, a light source 160, and a photo-sensor array 140. The photo-sensor array 140 may be a color CIS, a color CCD, or a color photodiode array. The optical system 120 may include an objective lens unit 122 and an imaging lens unit 124.

A light provided by the light source 160 is changed into a parallel light through a collimation lens 162. The parallel light is provided to a beam splitter 164 and provided to the objective lens portion 122. A light, passing through the objective lens unit 122, is reflected by the color scale 110 to pass through the objective lens unit 122 and the beam splitter 164. The light, passing through the objective lens unit 122 and the beam splitter 164, is provided to the imaging lens unit 124. The light, passing through the imaging lens section 124, provides an image of the color scale 100 to the photo-sensor array 140. The image obtained by the photo-sensor array 140 is provided to a processing unit 150 to be data-processed. The processing unit 150 may process an image using a predetermined algorithm after dividing the image based on RGB colors.

Figure 2:
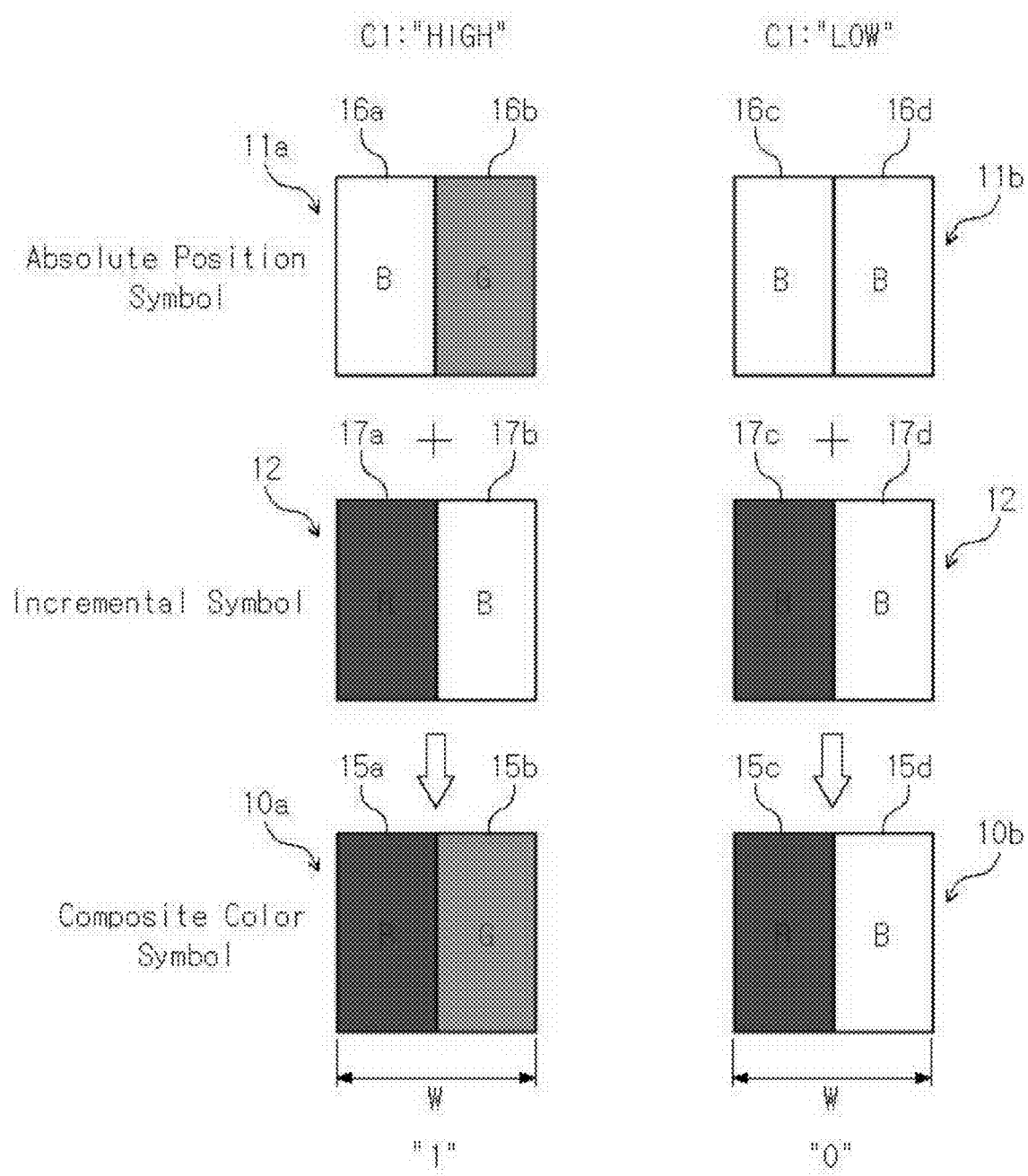
FIG. 2 is a conceptual diagram of symbols constituting a color scale pattern according to an example embodiment of the present disclosure.

FIG. 2 is a conceptual diagram of symbols constituting a color scale pattern according to an example embodiment of the present disclosure.

Figure 3:
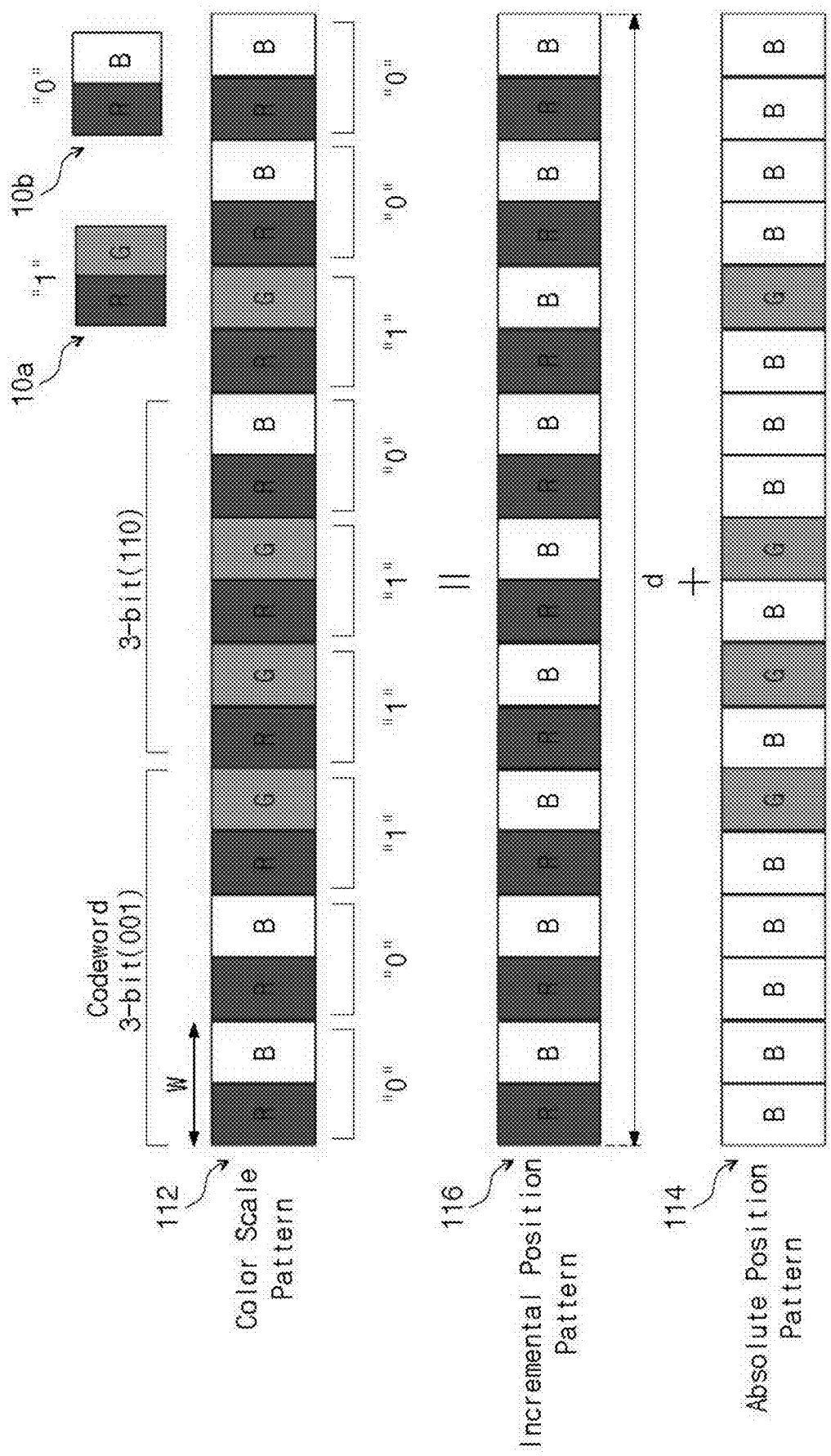
FIG. 3 is a conceptual diagram of a color scale pattern formed using the symbols in FIG. 2.

FIG. 3 is a conceptual diagram of a color scale pattern formed using the symbols in FIG. 2.

Referring to FIGS. 2 and 3, a color scale pattern 112 is formed to replace a pseudo-random-code or a binary code with symbols 10a and 10b.

For example, a sequence of pseudo-random-codes may be '001110100' and may include 3 bits of code words. Each bit of the pseudo-random-code indicates a "first state (HIGH)" or a "second state (LOW)".

The first symbol 10a has a first width w and represents a first state ("HIGH"). The second symbol 10b has the first width w and represents the second state ("LOW"). The second symbol 10b has a color structure different from a color structure of the first symbol 10a. The first width w may range from several micrometers to several millimeters.

The first symbol 10a is divided into two or more segments 15a and 15b having the same structure. The second symbol 10b is divided into two or more first segments 15c and 15d having the same structure. The first symbol 10a has the same shape as the second symbol 10b, but may have different color structures from each other.

Among segments of the first symbol 10a, a segment 15a is designed to have the same color (for example, red) as a segment 15c of the second symbol 10b at a corresponding position. The segment 15a designed to have the same color (red) may provide incremental position information. Except for the segment 15a providing the incremental position information, other segments 15b and 15d may be painted in different colors to provide absolute position information.

The first symbol 10a may be formed by color composition of the first absolute position symbol 11a and the incremental position symbol 12. The second symbol 10b may be formed by color composition of the second absolute position symbol 11b and the incremental position symbol 12. Each of the first absolute position symbol 11a and the second absolute position symbol 11b is divided into two or more segments 16a and 16b having the same structure. The incremental position symbol 12 is divided into two or more segments 17a and 17b having the same structure.

The first absolute position symbol 11a represents a first state ("HIGH") and the second absolute position symbol 11b represents a second state ("LOW"). The first absolute position symbol 11a may include a second segment 16b filled with a first color (e.g., green) among three primary colors. A first segment 16a of the first absolute position symbol 11a may be filled with black. A first segment 16c and a second segment 16d of the second absolute position symbol 11b may be filled with black.

The incremental position symbols 12 may have the same structure and pattern. In the incremental position symbol 12, at least one segment 17a may be filled with a second color (for example, red) among the three primary colors. In the incremental position symbol 12, another segment 17b may be filled with black.

A first symbol 10a may be formed by color composition of a first absolute position symbol 11a and the incremental position symbol 12. A second symbol 10b may be formed by color composition of a second absolute position symbol 11b and the incremental position symbol 12. The color composition is a color composition of light, and black does not contribute to a composition with another color.

Each of the first symbol 10a and the second symbol 10b includes two segments. A first segment 15a of the first symbol 10a may have a second color (red), and a second segment 15b of the first symbol 10a may have a first color (green). A first segment 15c of the second symbol 10b may have a second color (red), and a second segment 15d of the second symbol 10b may have a black color.

A first segment 16a of the first absolute position symbol 11a may have a black color, and a second segment 16b of the first absolute position symbol 11a may have the first color. A first segment 16c of the second absolute position symbol 11b may have a black color, and a second segment 16d of the second absolute position symbol 11b may have a black color. A first segment 17a of the incremental position symbol 12 may have a second color (red), and a second segment 17b of the incremental position symbol 12 may have a black color. The first color may be one of RGB, and the second color may be another one of RGB.

Referring to FIG. 3, a color scale pattern 112 of a color scale is arranged to represent a binary code using a first symbol 10a having a first width w and indicating a first state ("HIGH") and a second symbol 10b having a second width w and indicating a second state ("LOW"). Each of the first symbol 10a and the second symbol 10b is divided into two or more segments having the same structure. The first symbol 10a is formed by color composition of the first absolute position symbol 11a and the incremental position symbol 12 having the same structure. The second symbol 10b is formed by color composition of the second absolute position symbol 11b and the incremental position symbol 12 having the same structure. The first absolute position symbol 11a and the second absolute position symbol 11b represent the first state ("HIGH") or the second state ("LOW") using a first color. The incremental position symbol 12 includes a second color.

Each of the first symbol 10a and the second symbol 10b may include two segments. A second segment of the first absolute position symbol 11a may have a first color, and a first segment of the first absolute position symbol 11a may have a black color. First and second segments of the second absolute position symbol 11b may have a black color. A second segment of the incremental position symbol 12 may have a black color. A first segment of the incremental position symbol 12 may have a second color.

The absolute position pattern 114 is formed by replacing a sequence of binary codes with the first absolute position symbol 11a and the second absolute position symbol 11b.

The incremental position pattern 116 is formed by replacing a sequence including binary codes with incremental position symbols of the same structure.

The color scale pattern 112 is formed using color composition after the absolute position pattern 114 and the incremental position pattern 116 overlap each other.

Figure 4:
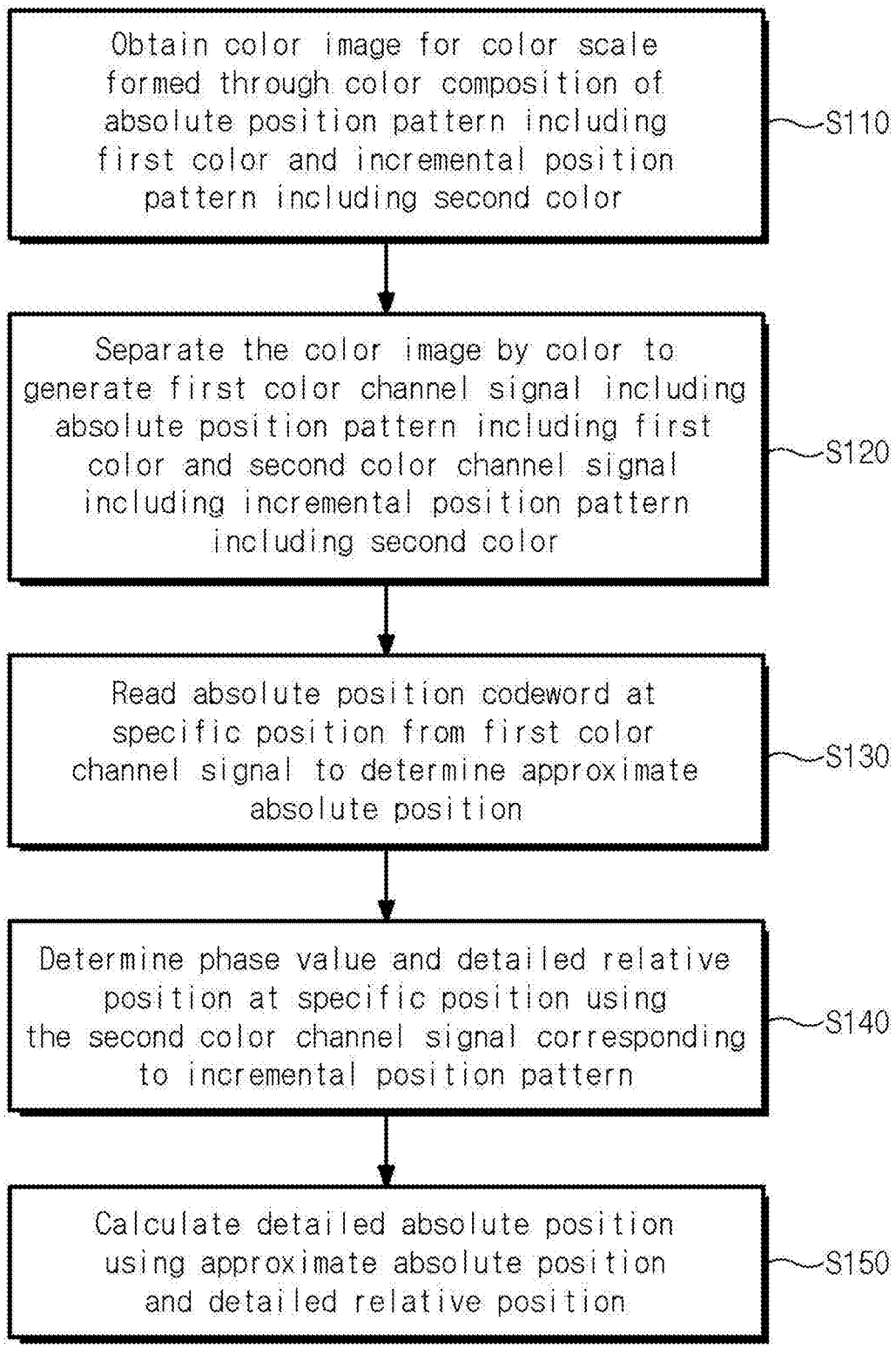
FIG. 4 is a flowchart illustrating a method of reading a color scale position according to an example embodiment of the present disclosure.

FIG. 4 is a flowchart illustrating a method of reading a color scale position according to an example embodiment of the present disclosure.

Figure 5:
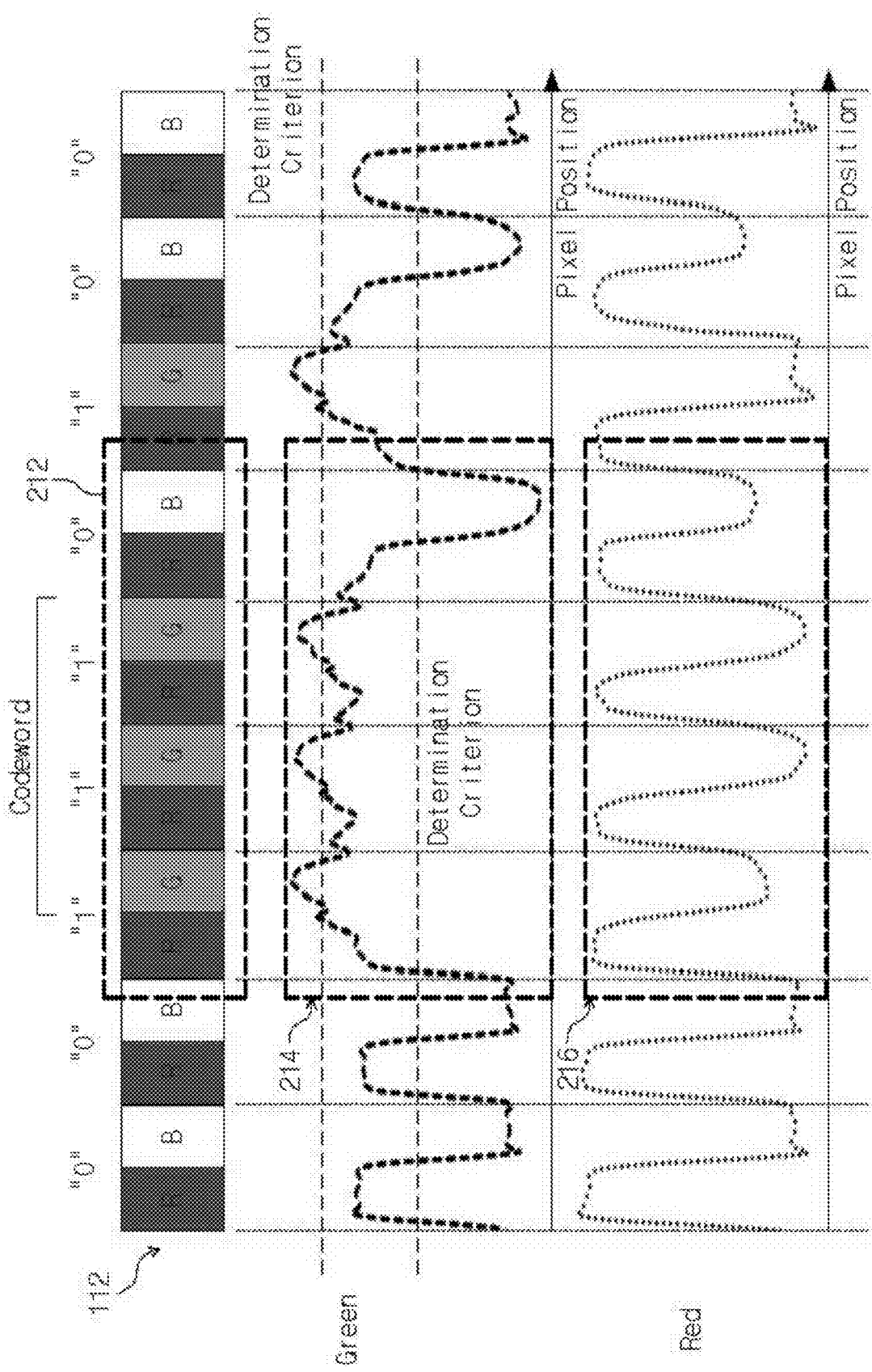
FIG. 5 is a graph illustrating a first color channel signal including an absolute position pattern and a second color channel signal including an incremental position pattern.

FIG. 5 is a graph illustrating a first color channel signal including an absolute position pattern and a second color channel signal including an incremental position pattern.

Referring to FIGS. 4 and 5, a method of reading a position of a color scale includes obtaining a color image 212 for a color scale 112 generated through color composition of an absolute position pattern 114 including a first color and an incremental position pattern 116 including a second color (S110), separating the color image 212 by color to generate a first color channel signal 214 including an absolute position pattern including a first color and a second color channel signal 216 including an incremental position pattern including the second color (S120), and reading an absolute position codeword at a specific position from the first color channel signal 216 to determine an approximate absolute position (S130).

The method may further include determining a phase value and a detailed relative position at a specific position using the second color channel signal 216 corresponding to the incremental position pattern 116 (S140) and calculating a detailed absolute position using the approximate absolute position and the detailed relative position (S150).

A color photo-sensor array 140 may capture a color scale image 112 to generate a color image 212. The color photo-sensor array 140 may include a plurality of two-dimensional pixel arrays. Each pixel of the color photo-sensor array 140 may be divided into RGB subpixels. A plurality of pixels of the color photo-sensor array 140 may image a single segment. The color image 212 should contain at least one codeword to read an absolute position.

The first color channel signal 214 may be an image including subpixels representing a first color (green) in the color image 212. In the case in which the color scale pattern 112 includes red representing an incremental position pattern 116 and green representing an absolute position pattern 114, the first color channel signal 214 may be an image including green subpixels. The first color channel signal 214 may be expressed as intensity in a traveling direction of the color scale pattern 112. The first color channel signal 214 may be displayed in a range of 0 to 255 depending on a position. The first color channel signal 214 may theoretically detect only a green signal without detecting a red signal.

However, according to an experimental result of the present disclosure, the first color channel signal 214 may provide a significant noise component due to the red incremental position pattern 116. The first color channel signal 214 provides sufficient intensity due to the absolute position pattern 114 of green. Thus, the first color channel signal 214 may read the peak position pattern 11 when a determination criterion having a specific signal level or higher is used.

The second color channel signal 216 may be an image including subpixels representing a second color (red) in the color image 212. In the case in which the color scale pattern 112 includes red representing the incremental position pattern 116 and green representing the absolute position pattern 114, the second color channel signal 216 may be an image including red subpixels. The second color channel signal 216 may provide a little noise due to the absolute position pattern 114 of green. However, the second color channel signal 216 may have periodicity.

An absolute position codeword may be read from the first color channel signal 214 at the specific position to determine an approximate absolute position. Specifically, the absolute color codeword is read from the first color channel signal 214 using a signal level at the specific position. From the first color channel signal 214, the absolute position code may be '1110'. A codeword indicating a position may be '111' or '110'. A method of selecting an absolute position codeword is not limited, but a position, at which a phase value of the second color channel signal 216 is read, may vary depending on a selected position of a codeword.

When a phase value is calculated, a position, at which an absolute position codeword is read, does not have to be a central position of the second color channel signal 216. However, the position, at which the absolute position codeword is read, may vary depending on a position, at which a phase value is read, by processing a minimum image area. When an absolute position codeword is read at a central position of the first color channel signal 214, an absolute position code may be selected symmetrically with respect to the central position. In the case of three bits, two bits may be read in front of the central position and one bit may be read in back of the central position. When reading is performed from a starting position, an absolute position code of a corresponding bit may be read from the starting position. When reading is performed from an ending position, an absolute position code of a corresponding bit may be read to the ending position.

An absolute position value is calculated using a look-up table (LUT) corresponding to a codeword of the absolute position, and an approximate absolute position is calculated using the absolute position value.

Figures 6, 7:
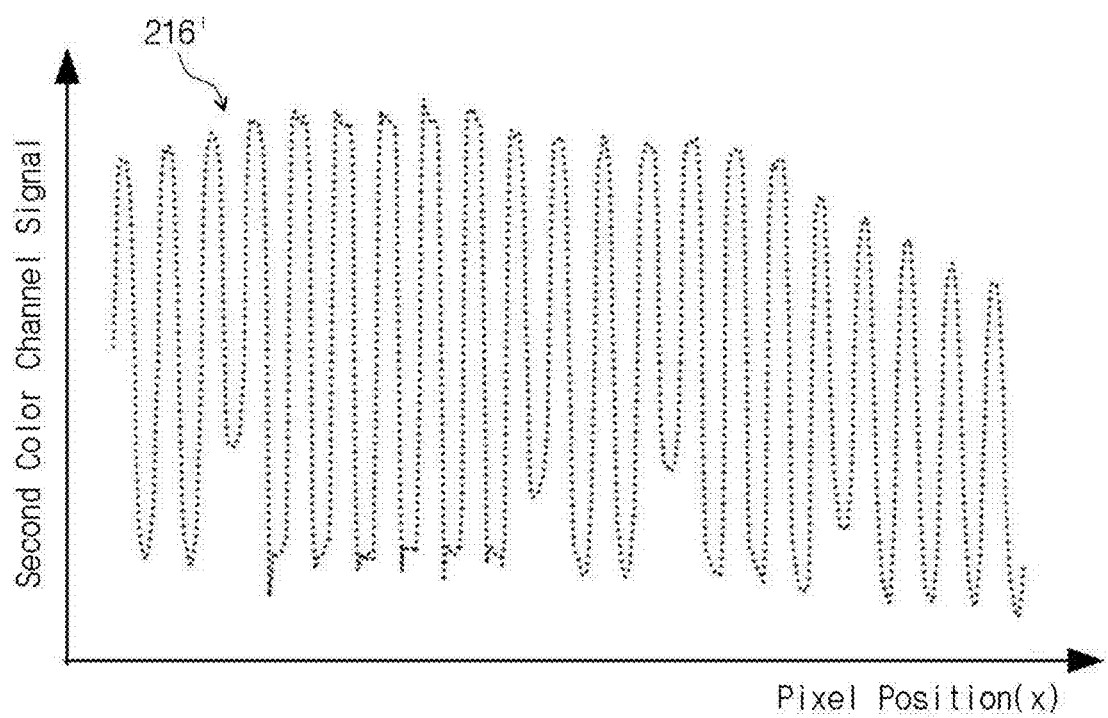
FIG. 6 is a conceptual diagram illustrating a relationship between a codeword and an absolute position value according to an example embodiment of the present disclosure.
FIG. 7 is a graph illustrating a second color channel signal corresponding to an incremental position pattern according to an example embodiment of the present disclosure.

FIG. 6 is a conceptual diagram illustrating a relationship between a codeword and an absolute position value according to an example embodiment of the present disclosure.

Referring to FIG. 6, in the case of, for example, a 3-bit codeword, a read codeword '111' corresponds to 7 in decimal, and an absolute position 2 is stored in a decimal address 7. Accordingly, the code word '111' corresponds to the absolute position 2, but a unit for an absolute position is not shown, so that an absolute position is roughly calculated by multiplying a width w or a pitch p representing a single bit.

FIG. 7 is a graph illustrating a second color channel signal corresponding to an incremental position pattern according to an example embodiment of the present disclosure.

Figure 8:
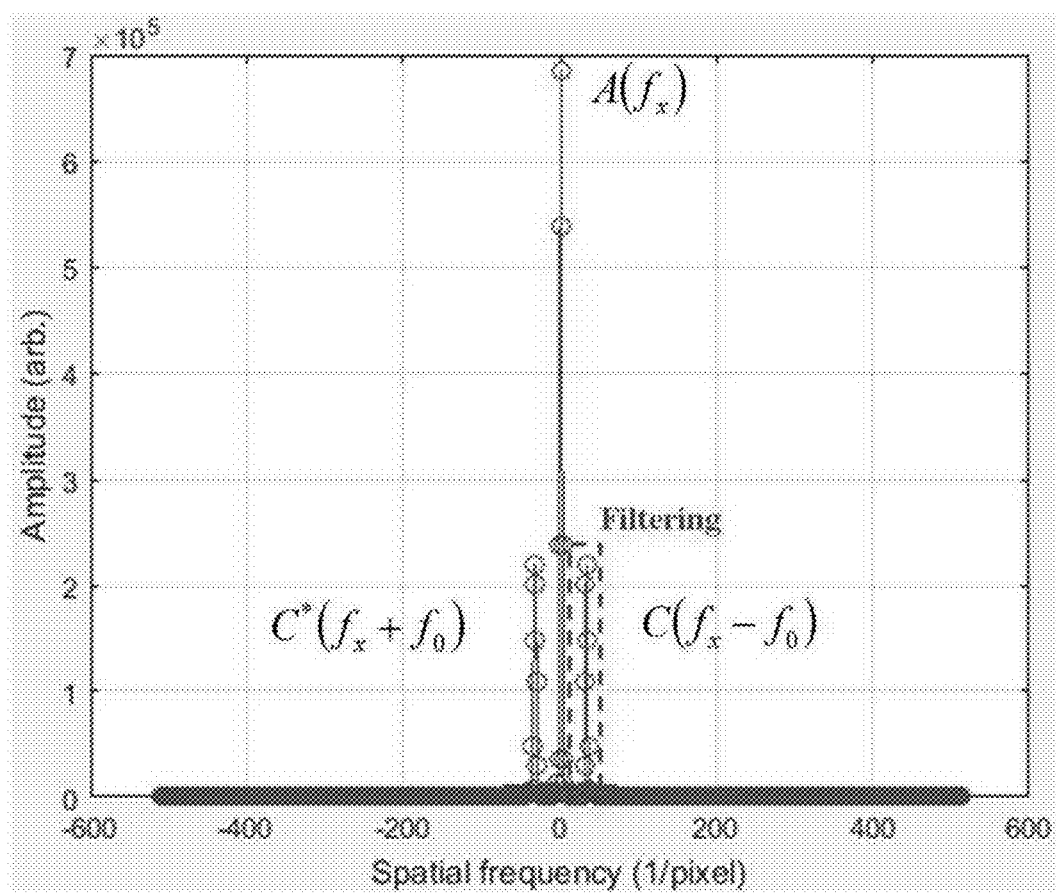
FIG. 8 illustrates Fourier spectrum and filter of the second color channel signal in FIG. 7.

FIG. 8 illustrates Fourier spectrum and filter of the second color channel signal in FIG. 7.

Figure 9:
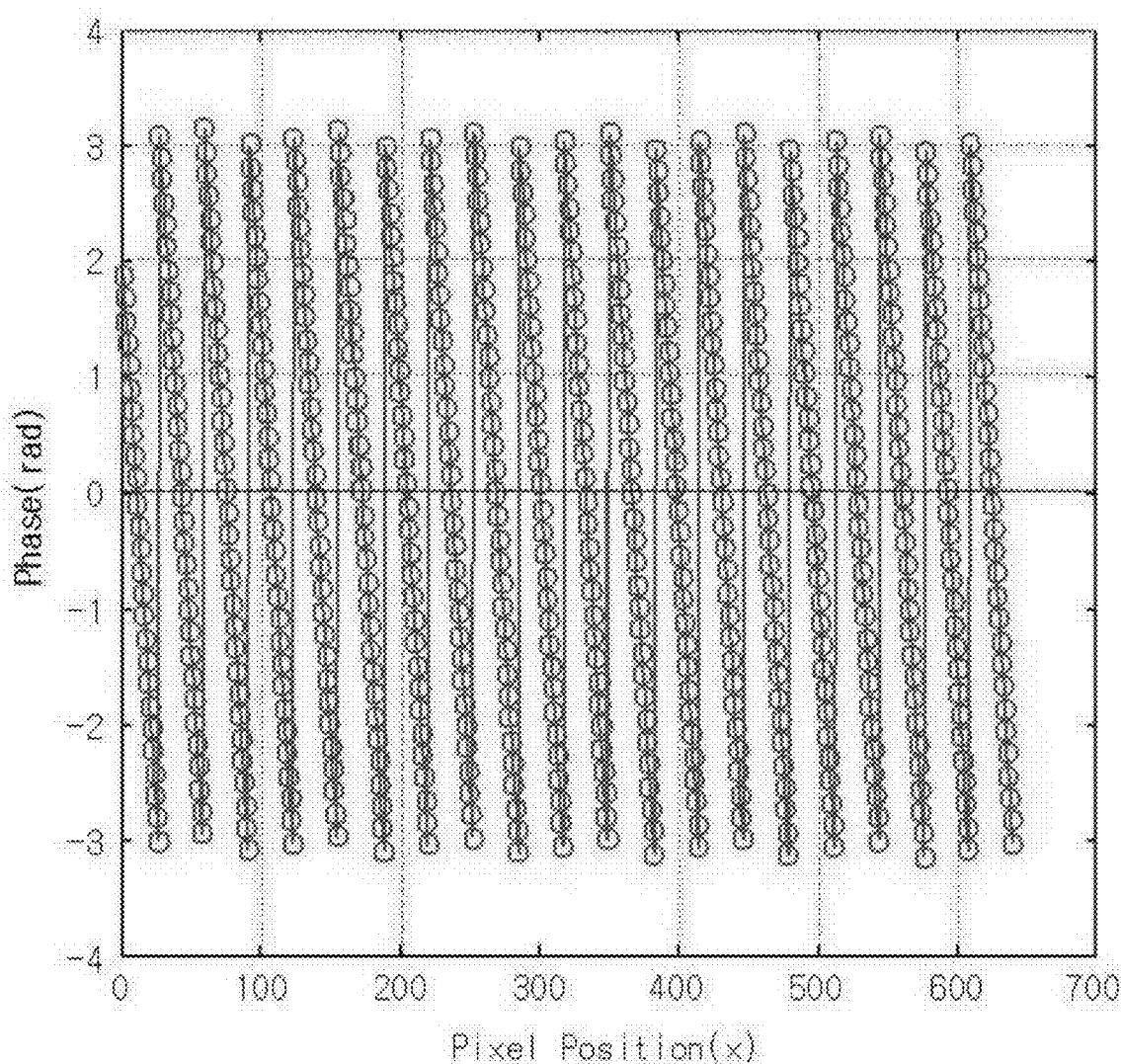
FIG. 9 is a graph illustrating a phase component obtained by inversely Fourier-transforming a positive Fourier component in FIG. 8.

FIG. 9 is a graph illustrating a phase component obtained by inversely Fourier-transforming a positive Fourier component in FIG. 8.

Figure 10:
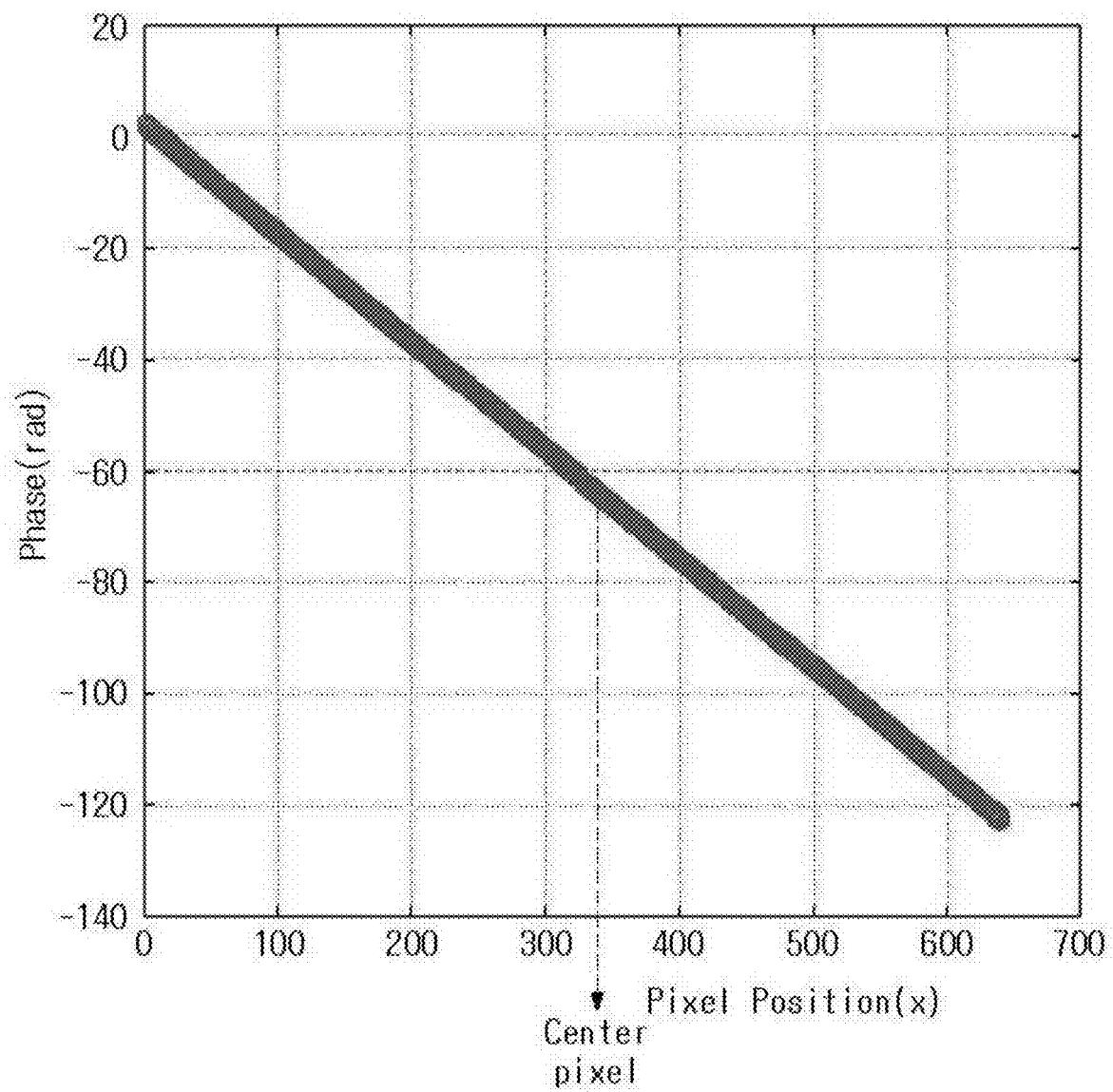
FIG. 10 is a graph formed through phase unwrapping of the phase component in FIG. 9.

FIG. 10 is a graph formed through phase unwrapping of the phase component in FIG. 9.

Referring to FIGS. 7 to 10, a phase value and a detailed relative position are determined at a specific position using a second color channel signal 216' corresponding to an incremental position pattern 116. Specifically, a second color channel signal 216' is Fourier-transformed into a spatial frequency domain to calculate a Fourier spectrum. The calculated Fourier spectrum is filtered to extract a positive spatial frequency component. The extracted positive spatial frequency component is inversely Fourier-transformed into a position space to calculate a phase. In the phase, a phase discontinuity position is detected to perform phase unwrapping. Then, a phase value is calculated at a specific position.

Since the second color channel signal 216' includes an incremental position pattern 116, the second color channel signal 216' may have a periodic signal. Such a periodic signal may have a phase, and the phase may provide a relative position within a width of a single symbol.

That is, the second color channel signal g(x) is expressed as a periodic signal due to an incremental position pattern, as follows:

$$g(x) = a(x) + b(x)\cos[2\pi f_0 x + \phi(x)] \quad \text{Equation (1)}$$
$$= a(x) + c(x)\exp(j2\pi f_0 x) + c^*(x)\exp(-j2\pi f_0 x)$$
$$c(x) = \frac{b(x)}{2}\exp[j\phi(x)]$$

where g (x) denotes a second color channel signal, a(x) denotes a background signal distribution, b(x) denotes an amplitude distribution of the second color channel signal, $f_o$ denotes a period of the second color channel signal, and y(x) denotes a phase of the second color channel signal.

Referring to FIG. 8, when the second color channel signal is Fourier-transformed into a spatial frequency domain, a Fourier spectrum is expressed, as follows:

$$G(f_x) = A(f_o) + C(f_x - f_0) + C^*(f_x + f_o) \quad \text{Equation (2)}$$

where $G(f_x)$ denotes the Fourier spectrum of the second color channel signal g(x), $f_x$ denotes a spatial frequency in an x-axis direction, $A(f_x)$ denotes a Fourier spectrum of the background signal distribution, and $C(f_x - f_o)$ denotes a Fourier spectrum of c(x) and c*(x) shifted by $\pm f_o$ by the period of the second color channel signal.

A signal of the $C(f_x - f_o)$ component is separated through filtering. After applying the inverse Fourier transform to the filtered Fourier spectrum, a phase ψ(x) is calculated as follows:

$$\psi(x) = \tan^{-1} \frac{\text{Im}[IFFT\{C(f_x - f_0)\}]}{\text{Re}[IFFT\{C(f_x - f_0)\}]}$$ Equation (3)

$$= \tan^{-1}\left[\frac{b(x)\sin(2\pi f_0 x + \phi(x))}{b(x)\cos(2\pi f_0 x + \phi(x))}\right]$$

$$= \text{mod}[2\pi f_0 x + \phi(x)]$$

where Ψ(x) denotes a phase depending on an x-axis position, IFFT denotes an inverse Fourier transform, and mod denotes a modulo function to output a remainder value obtained by dividing an input value by π, and an output value of the modulo function has a value within a ±π range.

Referring to FIGS. 9 and 10, a phase discontinuity position is detected in a phase to perform phase unwrapping.

A phase-unwrapped phase is linearly fitted. From a result of the linear fitting, a phase value at a center pixel position (or another specific position) is determined within the ±π range. The determined phase value is set as a phase value of an incremental position pattern. A position, in which a modulo value of the phase value is zero, is found from the linearly fitting result. The found position is a position for reading an absolute position code.

Figure 11:
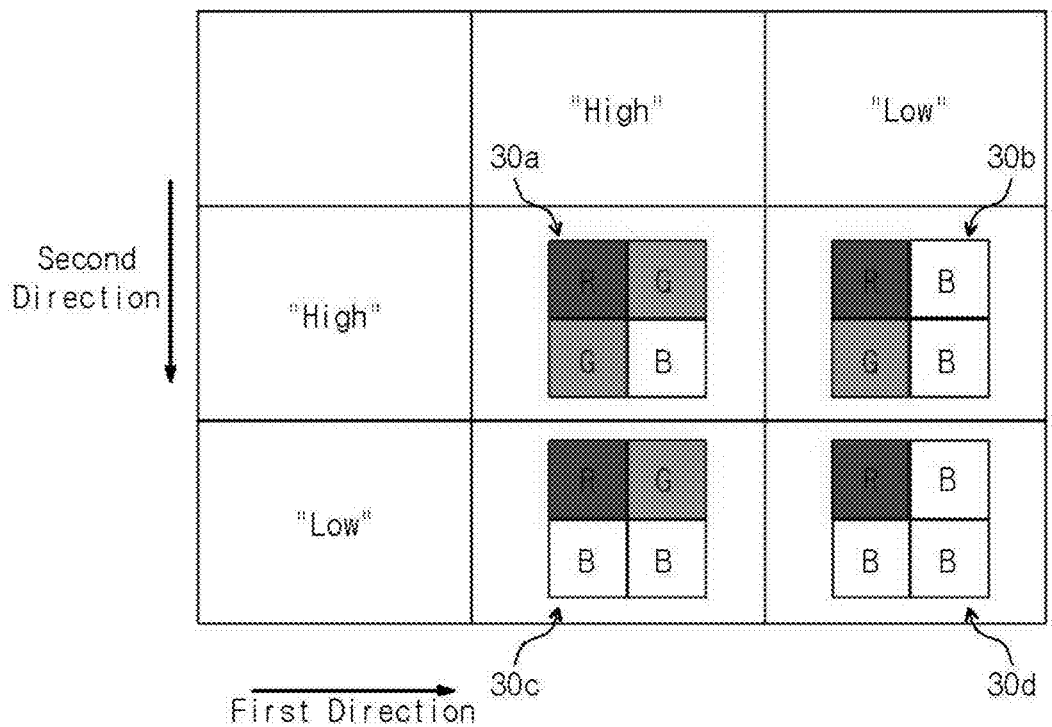
FIG. 11 illustrates symbols of a two-dimensional color scale according to an example embodiment of the present disclosure.

FIG. 11 illustrates symbols of a two-dimensional color scale according to an example embodiment of the present disclosure.

Figure 12:
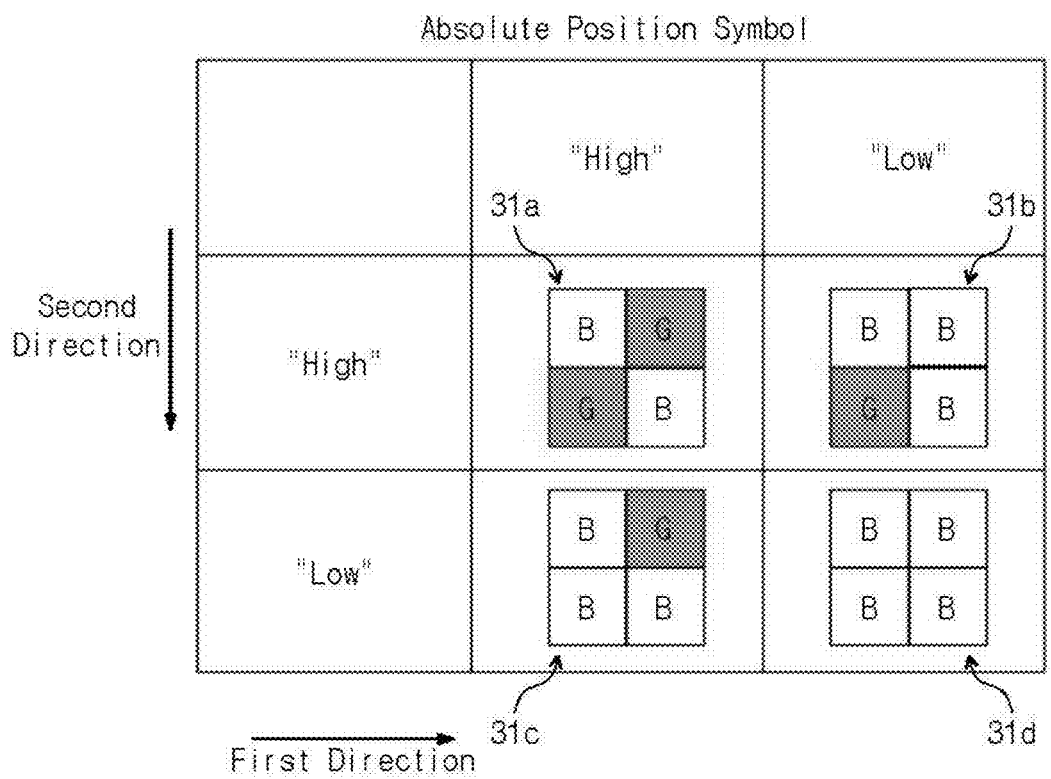
FIG. 12 illustrates an absolute position symbol for composition of symbols in FIG. 11.

FIG. 12 illustrates an absolute position symbol for composition of symbols in FIG. 11.

Figure 13:
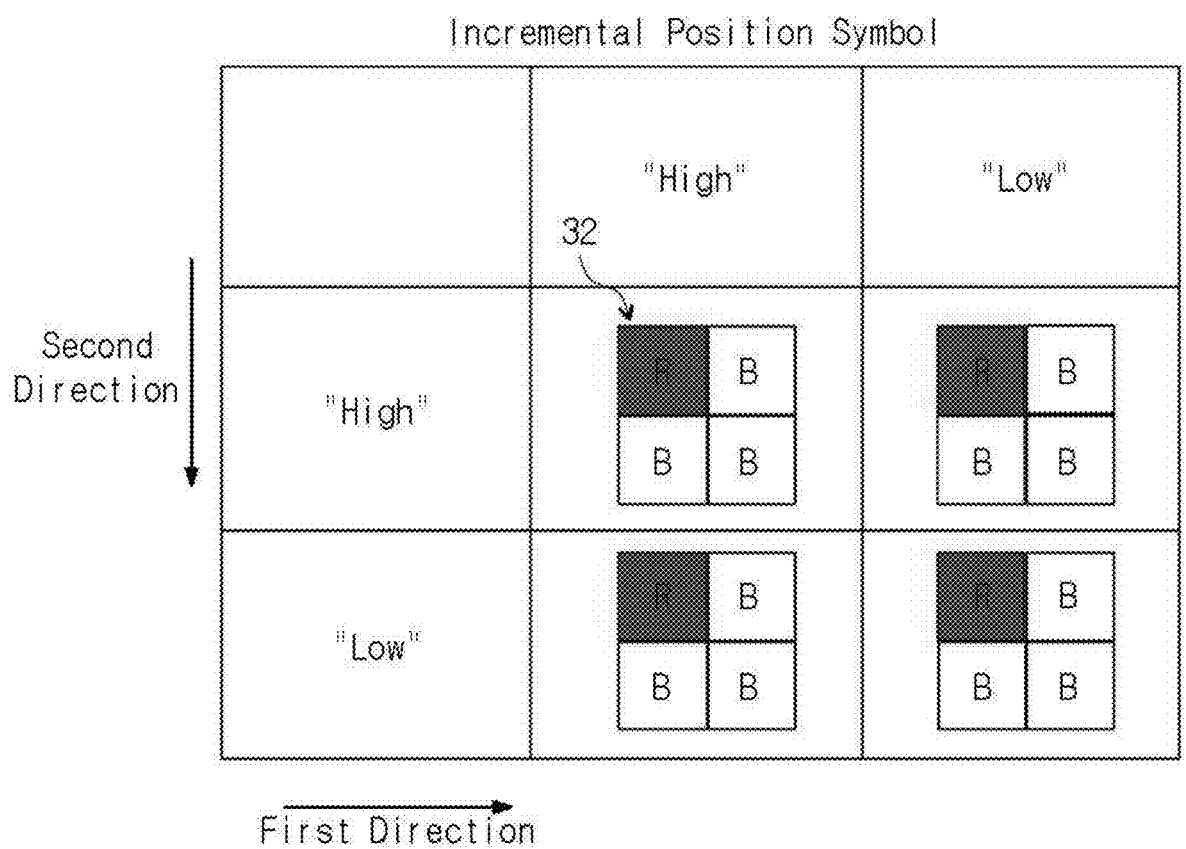
FIG. 13 illustrates incremental position symbols for composition of symbols in FIG. 11.

FIG. 13 illustrates incremental position symbols for composition of symbols in FIG. 11.

Figure 14:
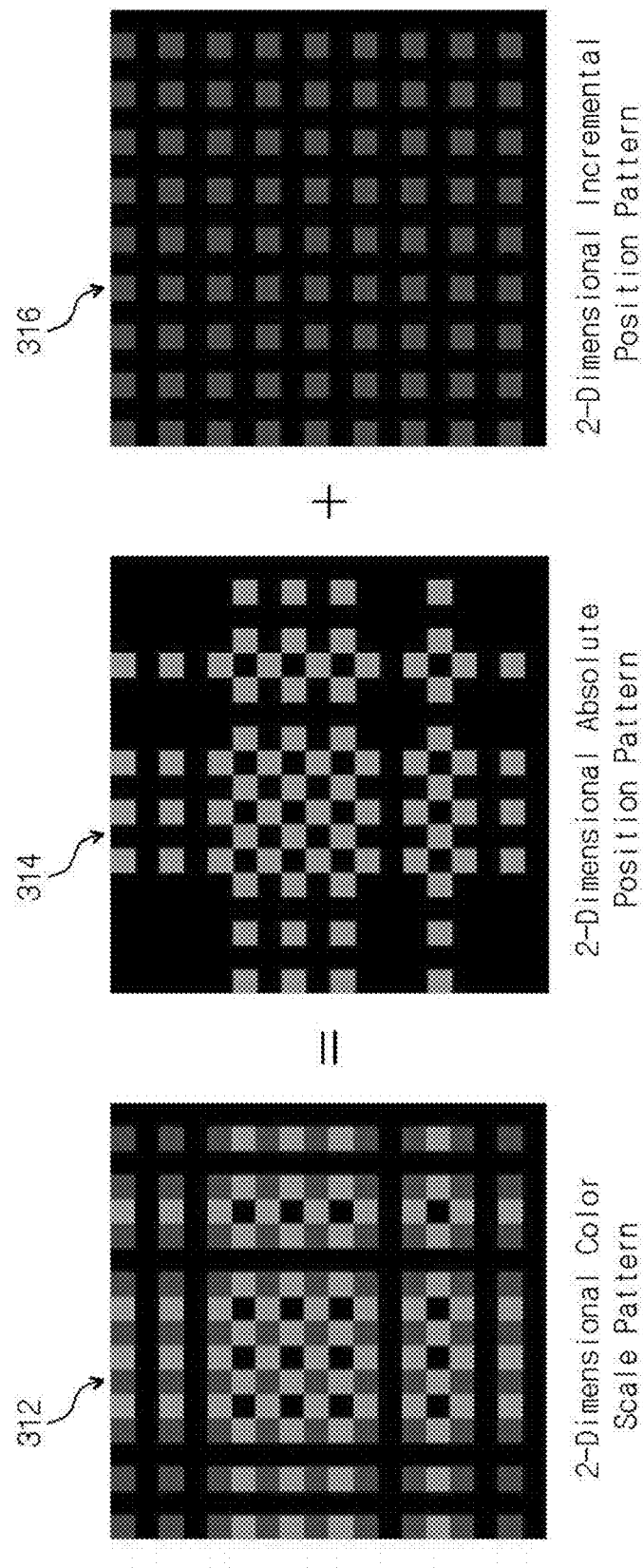
FIG. 14 illustrates a two-dimensional color scale pattern, a two-dimensional absolute position pattern, and a two-dimensional incremental position pattern.

FIG. 14 illustrates a two-dimensional color scale pattern, a two-dimensional absolute position pattern, and a two-dimensional incremental position pattern.

Figure 15:
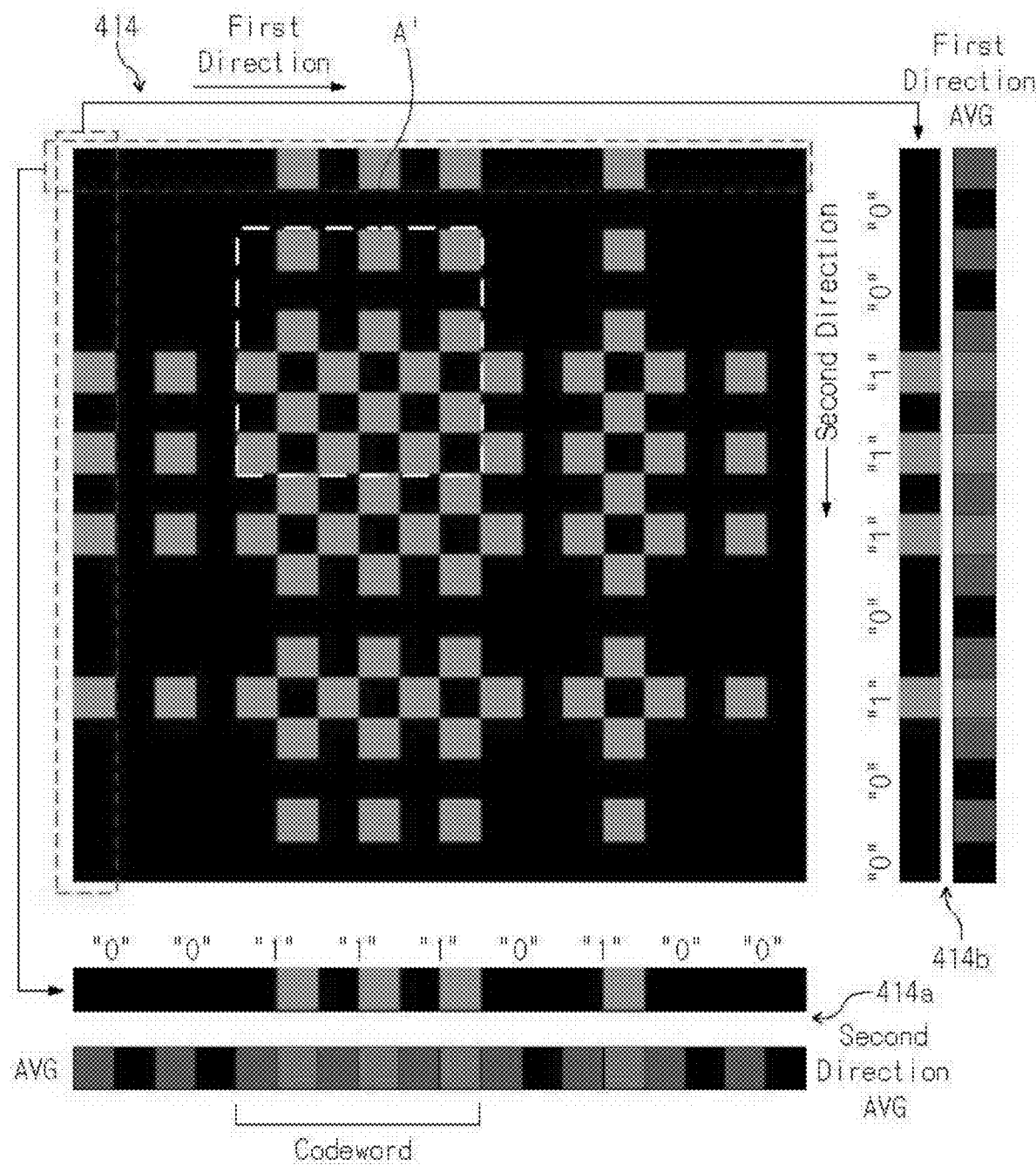
FIG. 15 illustrates a two-dimensional absolute position pattern.

FIG. 15 illustrates a two-dimensional absolute position pattern.

Figure 16:
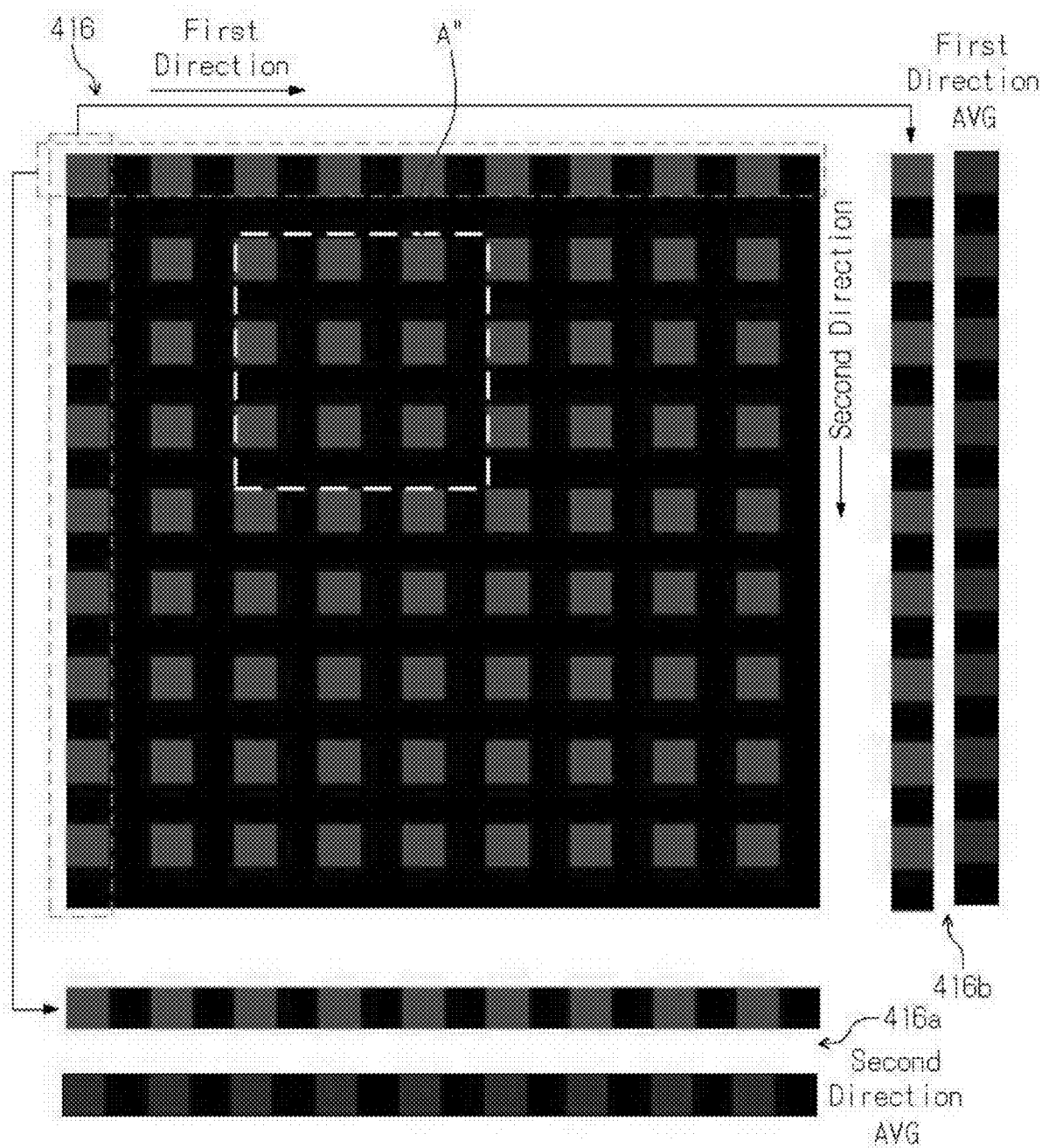
FIG. 16 illustrates a two-dimensional incremental position pattern.

FIG. 16 illustrates a two-dimensional incremental position pattern.

Figure 17:
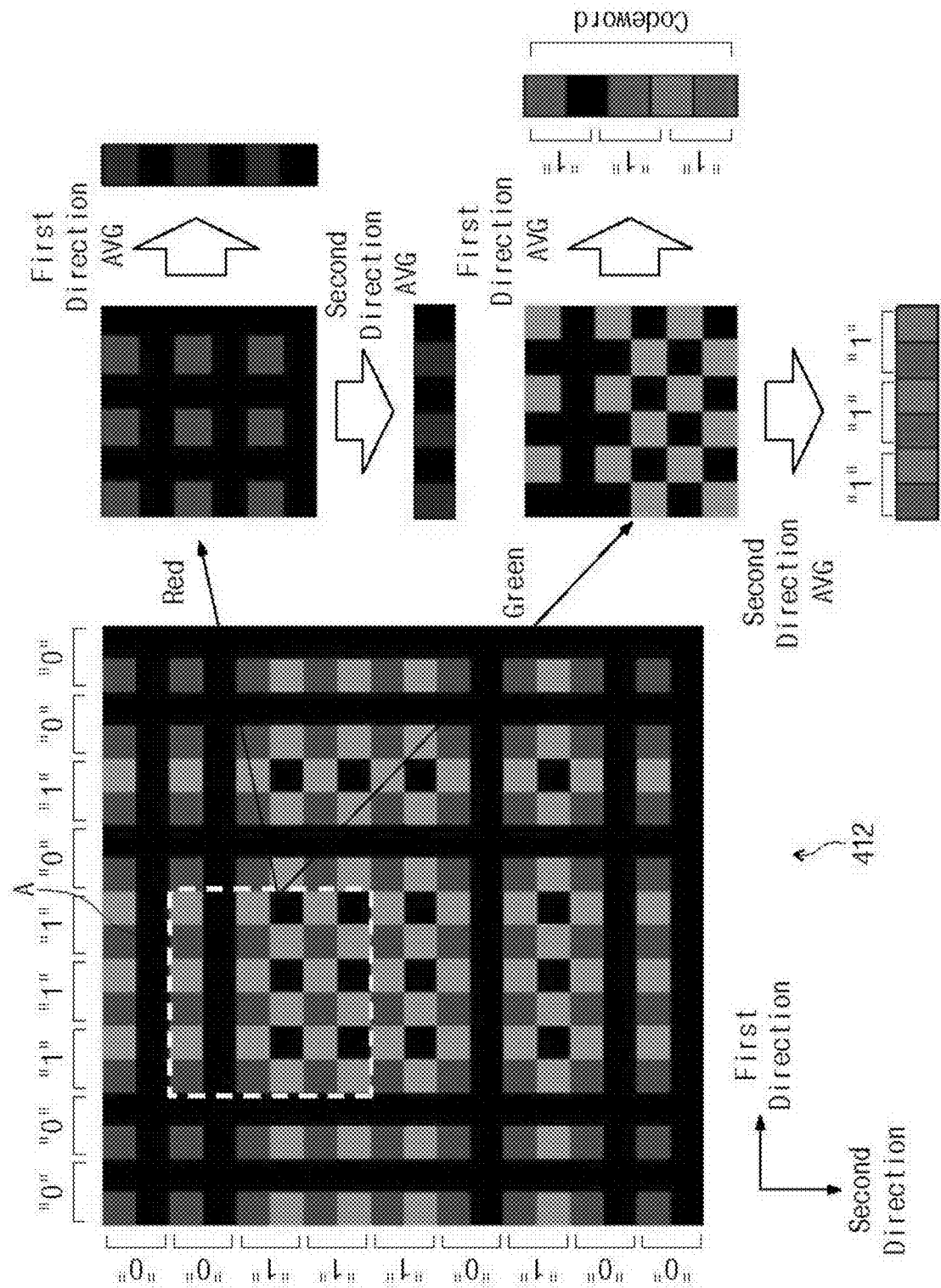
FIG. 17 is a conceptual diagram illustrating a method of decoding a two-dimensional color scale pattern.

FIG. 17 is a conceptual diagram illustrating a method of decoding a two-dimensional color scale pattern.

Referring to FIGS. 12 to 17, a two-dimensional color scale 312 is arranged to represent binary codes using first to fourth symbols 30a to 30d, each including 2×2 segments. The first symbol 30a represents a first state ("HIGH") in a first direction and a first state ("HIGH") in a second direction. The second symbol 30b represents a second state ("LOW") in the first direction and a first state ("HIGH") in the second direction. The third symbol 30c represents a first state ("HIGH") in the first direction and a second state ("LOW") in the second direction. The fourth symbol 30d represents a second state ("LOW") in the first direction and a second state ("LOW") in the second direction. The first to fourth symbols 30a to 30d have black, a first color (green), and a second color (red), and have different color patterns from each other.

A first segment of a (1,1) coordinate of the first symbol 30a may have a second color (red), a second segment of a (1,2) coordinate of the first symbol 30a may have a first color (green), a third segment of a (2,1) coordinate of the first symbol 30a may the first color (green), and a fourth segment of a (2,2) coordinate of the first symbol 30a may have a black color.

A first segment of a (1,1) coordinate of the second symbol 30b may have a second color (red), a second segment of a (1,2) coordinate of the second symbol 30b may have a black color, a third segment of a (2,1) coordinate of the second symbol 30b may the first color (green), and a fourth segment of a (2,2) coordinate of the second symbol 30b may have a black color.

A first segment of a (1,1) coordinate of the third symbol 30c may have a second color (red), a second segment of a (1,2) coordinate of the third symbol 30c may have a first color (green), a third segment of a (2,1) coordinate of the third symbol 30c may black, and a fourth segment of a (2,2) coordinate of the third symbol 30c may have a black color.

A first segment of a (1,1) coordinate of the fourth symbol 30d may have a second color (red), a second segment of a (1,2) coordinate of the fourth symbol 30c may have a black color, a third segment of a (2,1) coordinate of the fourth symbol 30d may black, and a fourth segment of a (2,2) coordinate of the fourth symbol 30d may have a black color. The first color may be one of the three primary colors, and the second color may be another one of the three primary colors.

The first to fourth symbols 30a to 30d may be formed by color composition of light of the absolute position symbols 31a to 31d and the incremental position symbol 32. Absolute position symbols 31a to 31d may include 2×2 segments and may include different patterns of the first color.

The first absolute position symbol 31a represents a first state ("HIGH") in a first direction and a first state ("HIGH") in a second direction. The second absolute position symbol 31b represents a second state ("LOW") in the first direction and a first state ("HIGH") in the second direction. The third absolute position symbol 31c represents a first state ("HIGH") in the first direction and a second state ("LOW") in the second direction. The fourth absolute position symbol 31d represents a second state ("LOW") in the first direction and a second state ("LOW") in the second direction. The first through fourth absolute position symbols 31a to 31d have a first color and different patterns from each other.

A first segment of a (1,1) coordinate of the first absolute position symbol 31a may have a black color, a second segment of a (1,2) coordinate of the first absolute position symbol 31a may have the first color (green), a third segment of a (2,1) coordinate of the first absolute position symbol 31a may have the first color (green), and a fourth segment of a (2,2) coordinate of the first absolute position symbol 31a may have a black color.

A first segment of a (1,1) coordinate of the second absolute position symbol 31b may have a black color, a second segment of a (1,2) coordinate of the second absolute position symbol 31b may have a black color, a third segment of a (2,1) coordinate of the second absolute position symbol 31b may have the first color (green), and a fourth segment of a (2,2) coordinate of the second absolute position symbol 31b may have a black color.

A first segment of a (1,1) coordinate of the third absolute position symbol 31c may have a black color, a second segment of a (1,2) coordinate of the third absolute position symbol 31c may have the first color (green), a third segment of a (2,1) coordinate of the third absolute position symbol 31c may have a black color, and a fourth segment of a (2,2) coordinate of the third absolute position symbol 31c may have a black color.

A first segment of a (1,1) coordinate of the fourth absolute position symbol 31d may have a black color, a second segment of a (1,2) coordinate of the fourth absolute position symbol 31d may have a black color, a third segment of a (2,1) coordinate of the fourth absolute position symbol 31b may have a black color, and a fourth segment of a (2,2) coordinate of the fourth absolute position symbol 31b may have a black color.

The incremental position symbol 32 may include 2×2 segments. A first segment of a (1,1) coordinate of the incremental position symbol 32 is a second color (red), a second segment of a (1,2) coordinate of the incremental position symbol 32 may have a black color, a third segment of a (2,1) coordinate of the incremental position symbol 32 may have a black color, and a fourth segment of a (2,2) coordinate of the incremental position symbol 32 may have a black color.

The first symbol 30a may be formed by color composition of lights of the first absolute position symbol 31a and the incremental position symbol 32. The second symbol 30b may be formed by color synthesis of lights of the second absolute position symbol 31b and the incremental position symbol 32. The third symbol 30c may be formed by color composition of lights of the third absolute position symbol 31c and the incremental position symbol 32. The fourth symbol 30d may be formed by the color composition of lights of the fourth absolute position symbol 31d and the incremental position symbol 32.

The first to fourth symbols 30a to 30d may be arranged in a first direction and a second direction to represent a binary code. The binary code may be a pseudo-random-code. The pseudo-random-code may include 3 bits of codeword. A sequence of the pseudo-random-codes may be '001110100' and may include 3 bits of codeword. Each bit of the pseudo-random-code indicates a "first state (HIGH)" or a "second state (LOW)".

The arrangement of the first to fourth symbols 30a to 30d may constitute a two-dimensional color scale pattern 312. The two-dimensional color scale pattern 312 may be formed through color composition of the two-dimensional absolute position pattern 314 formed by the arrangement of the first to fourth absolute position symbols and the incremental position pattern 316 formed by the arrangement of the incremental position symbols.

The two-dimensional color scale pattern 312 is formed through color composition of the two-dimensional absolute position pattern 314, including black and a first color, and a two-dimensional incremental position pattern 316 including black and a second color.

Referring to FIG. 15, a sequence in the first direction may be '001110100', and a sequence in the second direction may be '001110100'. Corresponding symbols are arranged at positions corresponding to respective sequence coordinates.

After the photo-sensor array 140 captures the two-dimensional color scale pattern 312, a first color channel image 414 including a first color may be generated. Alternatively, the first color image 414 may include a portion A' of a two-dimensional absolute position pattern. A portion A' of the first color channel image 414 may include at least one codeword in the first direction and at least one codeword in the second direction to decode an absolute position. The first color may have a range of 0 to 255. The first color having a value of zero may have a black color.

In the first color channel image 414, an absolute position pattern of a single line, separately shown on a right side, represents a leftmost single line of the two-dimensional color scale pattern. When a signal level of a pattern disposed in the second direction is detected, a codeword in the second direction may be read.

To read a codeword in the second direction, the codeword in the second direction may be obtained by averaging signals in the first direction. That is, the codeword in the second direction may be divided into a first region in which all of 18 segments have a black color, a second region in which nine of 18 segments have the first color (green), and a third region in which four of 18 segments have the first color (green). A combination of the three regions may indicate a first state ("HIGH") or a second state ("LOW") in the first direction.

To read a codeword in the second direction, the codeword in the second direction may be obtained by averaging signals in the first direction even in the case of a portion of A' of the first color channel image 414.

In the first color channel image 414, an absolute position pattern of a single line separately shown on a lower side represents a single line on an uppermost side of the two-dimensional color scale pattern. When a signal level of the pattern disposed in the first direction is detected, a codeword in the first direction may be read.

On the other hand, to read a codeword in the second direction, the code word in the second direction may be obtained by averaging signals in the first direction. That is, the codeword in the second direction may divided into a first region in which all of 18 segments have a black color, a second region in which nine of 18 segments are the first color (green), and a third region in which four of 18 segments have the first color (green). A combination of the three regions may indicate a first state ("HIGH") or a second state ("LOW").

Referring to FIG. 16, after a photo-sensor array 140 captures the two-dimensional color scale pattern 312, a second color channel image 416 including a second color may be generated. The second color may have a range of 0 to 255. The second color having a value of zero may have a black color.

The incremental position pattern 316 may be disposed in such a manner that the second color (red) and black are alternately aligned in the first direction. The incremental position pattern 316 may be disposed in such a manner that the second color and black are alternately aligned in the second direction.

In the second color channel image 416, an incremental position pattern of a single line separately shown on a right side represents a leftmost single line of the two-dimensional color scale pattern. When a signal level of the pattern disposed in the second direction is detected, an incremental code in the second direction may be read.

In the second color channel image 416, an incremental position pattern of a single line separately shown on a lower side represents an uppermost single line of the two-dimensional color scale pattern. When the signal level of the pattern arranged in the first direction is detected, an incremental code in the first direction may be read.

On the other hand, to read an incremental code in the first direction, the incremental code in the first direction may be obtained by averaging signals in the second direction. That is, the incremental code in the first direction may be divided into a first region, in which all of 18 segments first area have a black color, and a second region in which nine of 18 segments have a second color (red). A combination of the two regions may represent a barcode in the first direction or an incremental code in the second direction.

Referring to FIG. 17, a color image indicated by region A is indicated by a region A' in a first color channel image 414 and indicated by region A" in a second color channel image 416. In the first color channel image 414, codewords in the first direction is determined after averaging the region A' in the second direction. In the first color channel image 414, codewords in the second direction is determined after averaging the region A' in the first direction.

A method of determining a two-dimensional color scale position according to another example embodiment of the present disclosure includes obtaining a color image 412 for a two-dimensional color scale pattern 312 formed through color composition of a two-dimensional absolute position pattern 314 including a first color and a two-dimensional absolute position pattern including a second color, separating the color image by color to generate a first color channel image including a two-dimensional absolute position pattern 314 including the first color and a second color channel image including a two-dimensional incremental position pattern including the second color, determining a first phase value in a first direction, a second phase value in a second direction, a first detailed relative position in the first direction, and a second detailed relative position in the second direction at a specific position using a second color channel image 416 corresponding to the two-dimensional incremental position pattern; reading a first absolute position codeword from the first color channel image 414 at the specific position in the first direction to determine a first approximate absolute position and reading a second absolute position codeword from the first color channel image at the specific position in the second direction to determine a second approximate absolute position in the second direction, and calculating a first detailed absolute position using the first approximate absolute position and the first detailed relative position and calculating a second detailed absolute position using the second approximate absolute position and the second detailed relative position.

A photo-sensor array 140 captures a portion or all of the two-dimensional color scale 312. The photo-sensor array may generate a color image 412 by capturing the two-dimensional color scale pattern 312. The color image 412 may be decomposed into the first color channel image 414 formed by first color pixels and a second color channel image 416 formed by second color pixels.

The first color channel image 414 may include a two-dimensional absolute position pattern 314 including the first color. The second color channel image 416 may include a two-dimensional incremental position pattern 316 including the second color.

The first phase value in the first direction, the second phase value in the second direction, and the first detailed relative position in the first direction, and the second detailed relative position in the second direction may be determined at a specific position using the second color channel image 416 corresponding to the two-dimensional incremental position pattern 316. Specifically, a second color channel signal 416*a* in the first direction may be generated in the second color channel image 416. The second color channel signal 416*a* in the first direction may be obtained through averaging in the second direction. A first direction Fourier spectrum may be calculated by Fourier-transforming the second color channel signal 416*a* in the first direction into a spatial frequency domain. The first direction Fourier spectrum may be filtered to extract a positive first direction spatial frequency component. The positive first direction spatial frequency component may be inversely Fourier-transformed into a position space to calculate a first phase. In the first phase, a phase discontinuity position may be detected to perform phase unwrapping. A first phase value may be calculated at a specific position.

In the second color channel image 416, a second color channel signal 416*b* in the second direction may be generated. The second color channel signal 416*b* in the second direction may be obtained through averaging in the first direction. A second direction Fourier spectrum may be calculated by Fourier-transforming the second color channel signal 416*b* in the second direction into a spatial frequency domain. The second direction Fourier spectrum may be filtered to extract a positive second direction spatial frequency component. The positive second direction spatial frequency component may be inversely Fourier-transformed into a position space to calculate a second phase. In the second phase, a phase discontinuity position in the second phase is detected to perform phase unwrapping. The second phase value may be calculated at a specific position.

A first absolute position codeword (for example, '111') is read from the first color channel image 414 at the specific position in the first direction to determine a first approximate absolute position in the first direction, and a second absolute position codeword (for example, '011') is read from the first color channel image 414 at the specific position in the second direction to determine a second approximate absolute position in the second direction. Specifically, a first color channel signal 414*a* in the second direction may be generated from the first color channel image 414. The first color channel signal 414*a* in the first direction may be obtained through averaging in the second direction. A codeword of the first absolute position may be read from the first color channel signal 414*a* at the specific position in the first direction using a signal level in the first direction. A first absolute position value may be calculated using a look-up table corresponding to the codeword at the first absolute position in the first direction. The first approximate absolute position may be calculated using the first absolute position value.

The codeword of the second absolute position may be read from the first color channel image using a signal level at the specific position in the second direction. Specifically, the first color channel signal 414*b* in the second direction may be generated from the first color channel image 414. The first color channel signal 414*b* in the second direction may be obtained through averaging in the first direction. A second absolute position value may be calculated using a look-up table corresponding to the codeword of the second absolute position in the second direction. The second approximate absolute position may be calculated using the second absolute position value.

Figure 18:
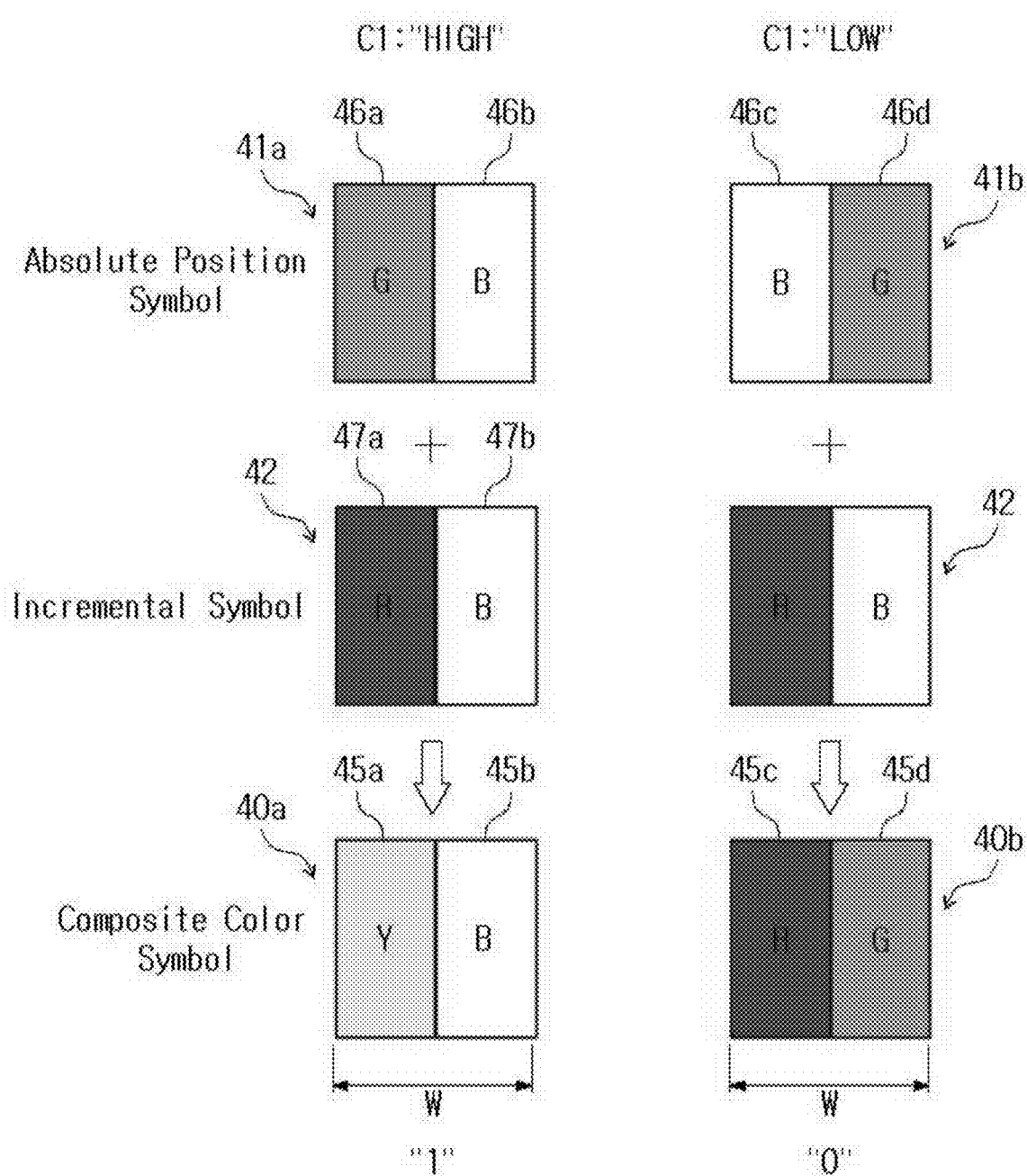
FIG. 18 is a conceptual diagram illustrating symbols constituting a color scale pattern according to another example embodiment of the present disclosure.

FIG. 18 is a conceptual diagram illustrating symbols constituting a color scale pattern according to another example embodiment of the present disclosure.

Figure 19:
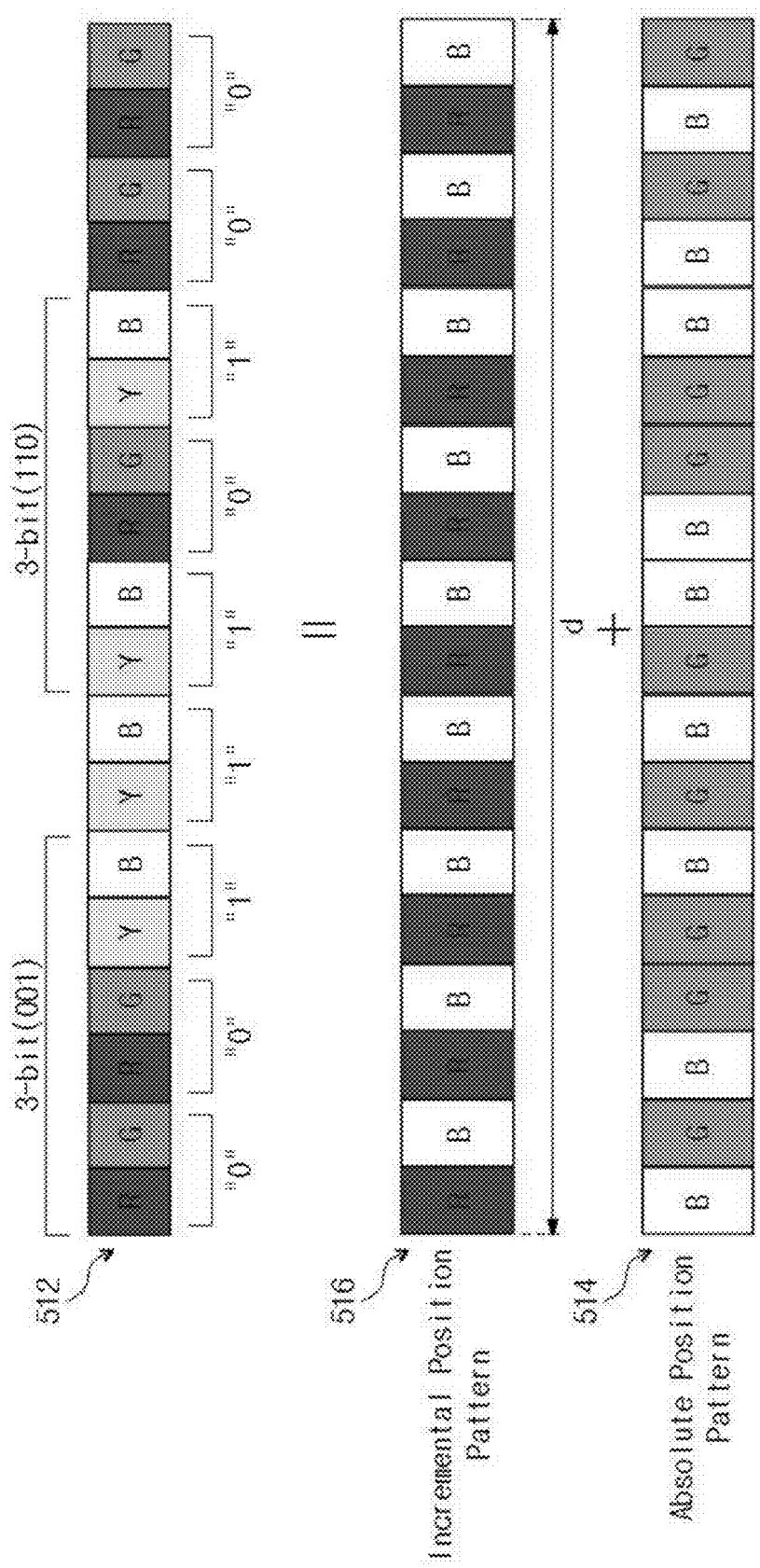
FIG. 19 is a conceptual diagram illustrating a color scale pattern formed using symbols in FIG. 18.

FIG. 19 is a conceptual diagram illustrating a color scale pattern formed using symbols in FIG. 18.

Referring to FIGS. 18 and 19, a color scale pattern 512 is formed by replacing a pseudo-random-code or a binary with symbols 40*a* and 40*b*.

A first symbol 40*a* has a first width w and represents a first state ("HIGH"). A second symbol 40*b* has a first width w and represents a second state ("LOW"). The second symbol 40*b* has a color structure different from a structure of the first symbol 40*a*. The first width w may range from a few micrometers to several millimeters.

The first symbol 40*a* is divided into two or more segments 45*a* and 45*b* having the same structure. The second symbol 40*b* is divided into two or more first segments 45*c* and 45*d* having the same structure. The first symbol 40*a* has the same shape as the second symbol 40*b*, but may have different color patterns to each other.

Each of the first symbol 40*a* and the second symbol 40*b* may have two segments. A first segment 45*a* of the first symbol 40*a* may have a color (yellow) composed from a first color (green) and a second color (red). A second segment 45*b* of the first symbol 40*a* may have a black color. A first segment 45*c* of the second symbol 40*b* may have a second color (red), and a second segment 45*d* of the second symbol 40*b* may have a first color (green).

The first symbol 40*a* may be formed by color composition of a first absolute position symbol 41*a* and an incremental position symbol 42. The second symbol 40*b* may be formed by color composition of the second absolute position symbol 41*b* and the incremental position symbol 42. The first absolute position symbol 41*a* and the second absolute position symbol 41*b* is divided into two or more segments 46*a* and 46*b* or 46*c* and 46*d* having the same structure, respectively. The incremental position symbol 42 is divided into two or more segments 47*a* and 47*b* having the same structure. A first absolute position symbol 41*a* indicates a first state ("HIGH"), while a second absolute position symbol 41*b* indicates a second state ("LOW"). The first absolute position symbol 41*a* includes at least one segment 46*a* filled with a first color (for example, green) among three primary colors, and the other segment 46*b* of the first absolute position symbol 41*a* may be colored in black. The second absolute position symbol 41*b* includes at least one segment 46*d* filled with a first color (for example, green) among the three primary colors 41*b*, and the second absolute position symbol 41*b* includes at least one segment 46*d*, and the other segment 46*c* of the second absolute position symbol 41*b* may be colored in black. Positions of the first absolute position symbol 41*a* and the segment filled with the first color in the second absolute position symbol 41*b* are interchangeable.

The incremental position symbol 42 may have the same structure and pattern. In the incremental position symbol 42, at least one segment 47*a* may be filled with a second color (for example, red) among the three primary colors. In the incremental position symbol 42, the other segment 47*b* may be filled with black.

The first symbol 40*a* may be formed by color composition of the first absolute position symbol 41*a* and the incremental position symbol 42. The second symbol 40*b* may be formed by the color combination of the second absolute position symbol 41*b* and the incremental position symbol 42. A color composition is a color composition of light, and black does not contribute to a composition with other colors.

Each of the first symbol 40*a* and the second symbol 40*b* may have two segments. Each of the first symbol 40*a* and the second symbol 40*b* has two segments. A first segment 45*a* of the first symbol 40*a* may have a composite color (yellow) of the first color and the second color, and a second segment 45*b* of the first symbol 40*a* may have a black color.

A first segment 45*c* of the second symbol 40*b* may have the second color (red), and a second segment 45*d* of the second symbol 40*b* may have the first color (green). That is, the first segment of the first absolute position symbol 41*a* may have the first color (green), and the second segment of the first absolute position symbol 41*a* may have a black color. The first segment of the second absolute position symbol 41*b* may have a black color, and the second segment of the second absolute position symbol 41*b* may have the second color (green). The first segment of the incremental position symbol 42 may have a second color (red), and the second segment of the incremental position symbol 42 may have a black color. The first color may be one of red, green, and black (RGB), and the second color may be another one of RGB.

A color scale pattern 512 of a color scale is disposed to represent a binary code using a first symbol 40*a*, having a first width w and representing a first state ("HIGH"), and a second symbol 40*b* having a first width w and representing a second state ("LOW"). Each of the first symbol 40*a* and the second symbol 40*b* is divided into two or more segments having the same structure. The first symbol 40*a* is formed by color composition of the first absolute position symbol 41*a* and the incremental position symbol 42 having the same structure. The second symbol 40*b* is formed by color composition of the second absolute position symbol 41*b* and the incremental position symbol 42 having the same structure. The first absolute position symbol 41*a* and the second absolute position symbol 41*b* represent a first state ("HIGH") or a second state ("LOW") using the first color. The incremental position symbol includes the second color.

The first symbol 40*a* and the second symbol 40*b* may have two segments. A first segment of the first absolute position symbol 41*a* may have a first color, and the second segment of the first absolute position symbol 41*a* may have a black color. A first segment of the second absolute position symbol 41*b* may have a black color, and a second segment of the second absolute position symbol 41*b* may have the first color. A first segment of the incremental position symbol 42 may have a second color, and a second segment of the incremental position symbol 42 may have a black color.

A method of reading a position of a color scale includes obtaining a color image for a color scale pattern 512 formed through color composition of an absolute position pattern 514 including a first color and an incremental position pattern 516 including a second color (S110), separating the color image by color to generate a first color channel signal including an absolute position pattern 514 including the first color and a second color channel signal including an incremental position pattern 516 including the second color (S120), and reading an absolute position codeword at a specific position from the first color channel signal to determine an approximate absolute position (S130).

The method may further include determining a phase value and a detailed relative position at a specific position using the second color channel signal corresponding to the incremental position pattern 516 (S140) and calculating a detailed absolute position using the approximate absolute position and the detailed relative position (S150).

Figure 20:
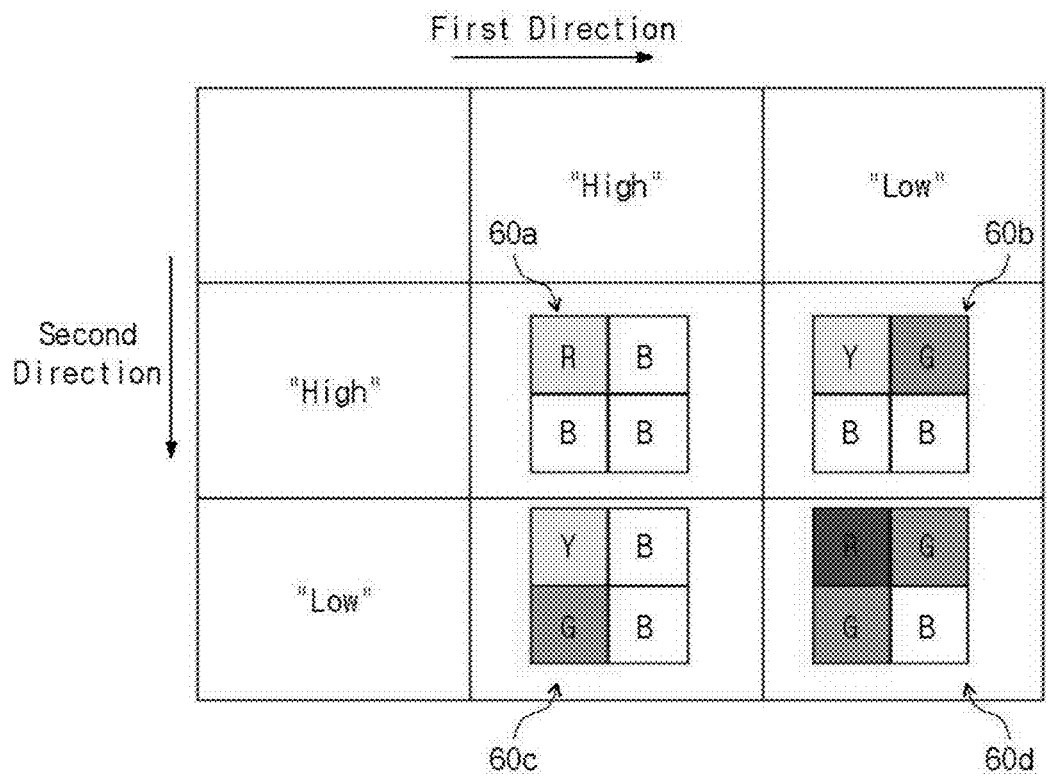
FIG. 20 is a conceptual diagram of symbols constituting a two-dimensional color scale pattern according to another example embodiment of the present disclosure.

FIG. 20 is a conceptual diagram of symbols constituting a two-dimensional color scale pattern according to another example embodiment of the present disclosure.

Figure 21:
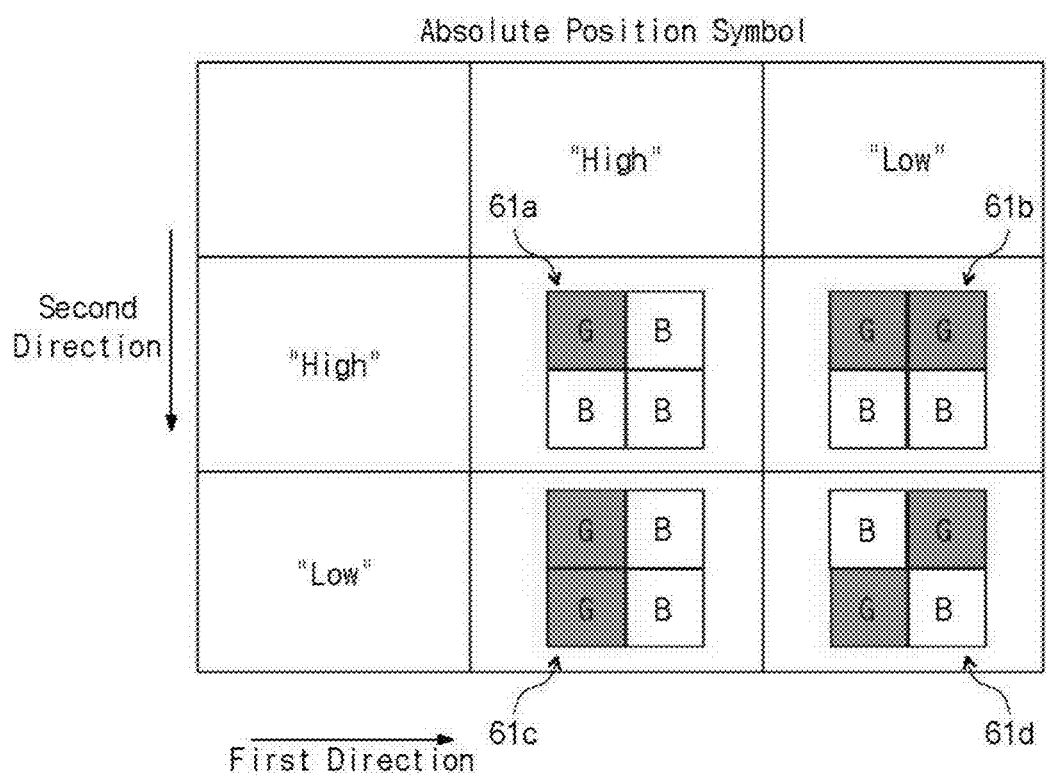
FIG. 21 illustrates an absolute position symbol for composition of the symbols in FIG. 20.

FIG. 21 illustrates an absolute position symbol for composition of the symbols in FIG. 20.

Figure 22:
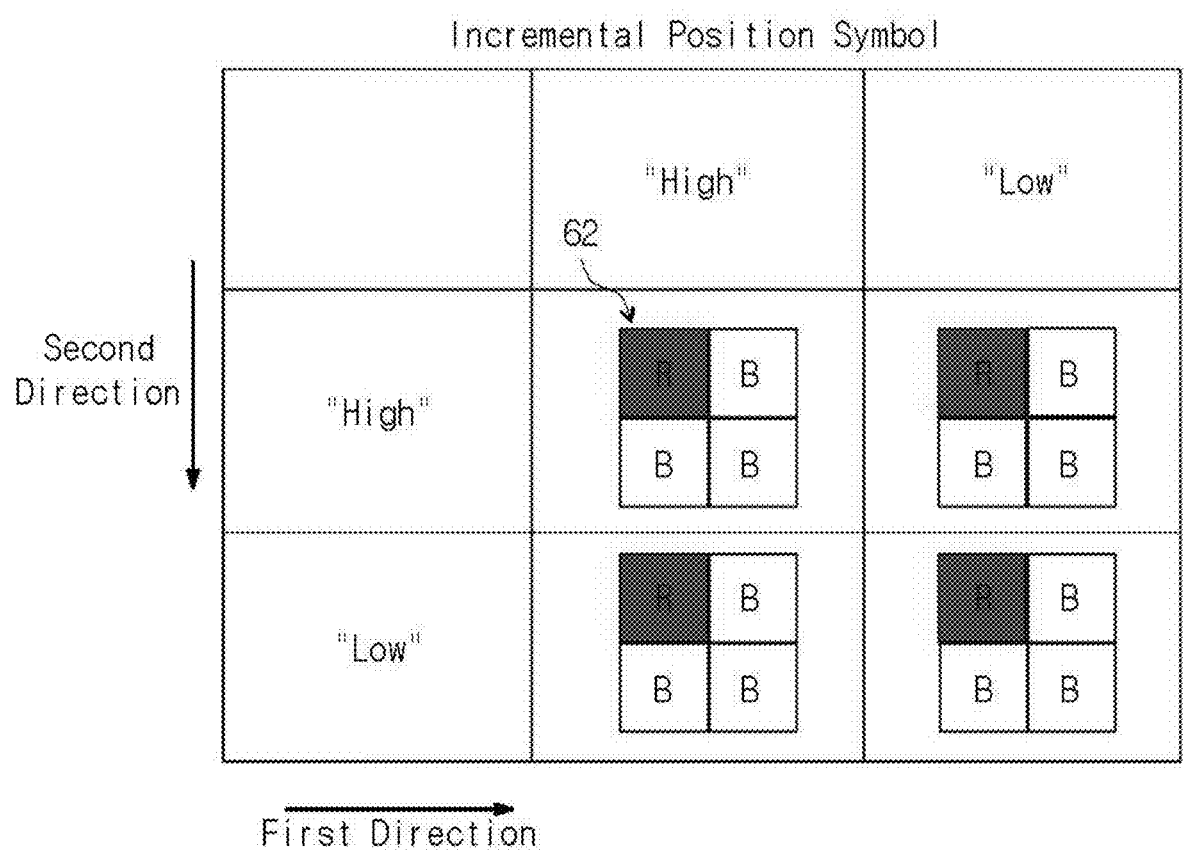
FIG. 22 illustrates incremental position symbols for composition of the symbols in FIG. 20.

FIG. 22 illustrates incremental position symbols for composition of the symbols in FIG. 20.

Figure 23:
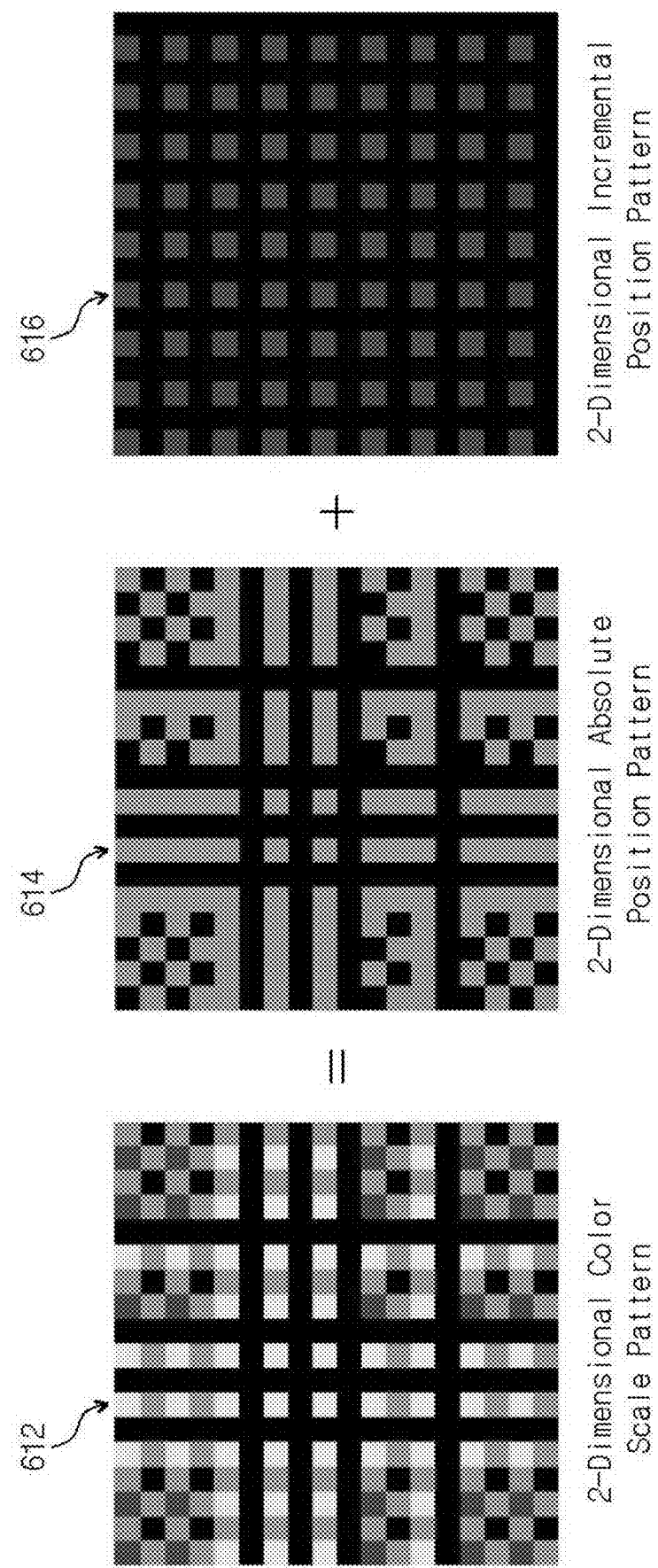
FIG. 23 illustrates a two-dimensional color scale pattern, a two-dimensional absolute position pattern, and a two-dimensional incremental position pattern.

FIG. 23 illustrates a two-dimensional color scale pattern, a two-dimensional absolute position pattern, and a two-dimensional incremental position pattern.

Figure 24:
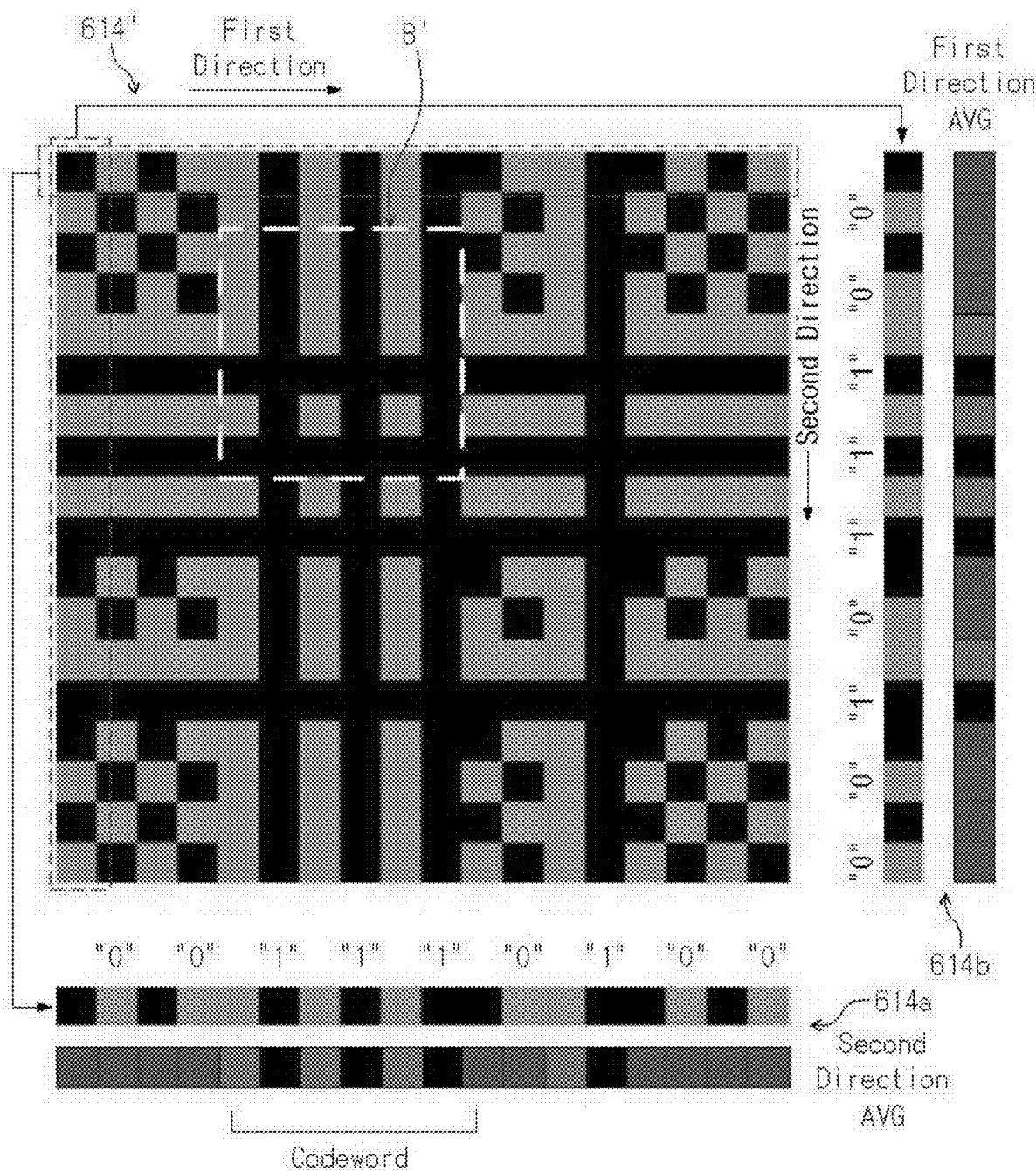
FIG. 24 illustrates a first color image including a two-dimensional absolute position pattern.

FIG. 24 illustrates a first color image including a two-dimensional absolute position pattern.

Figure 25:
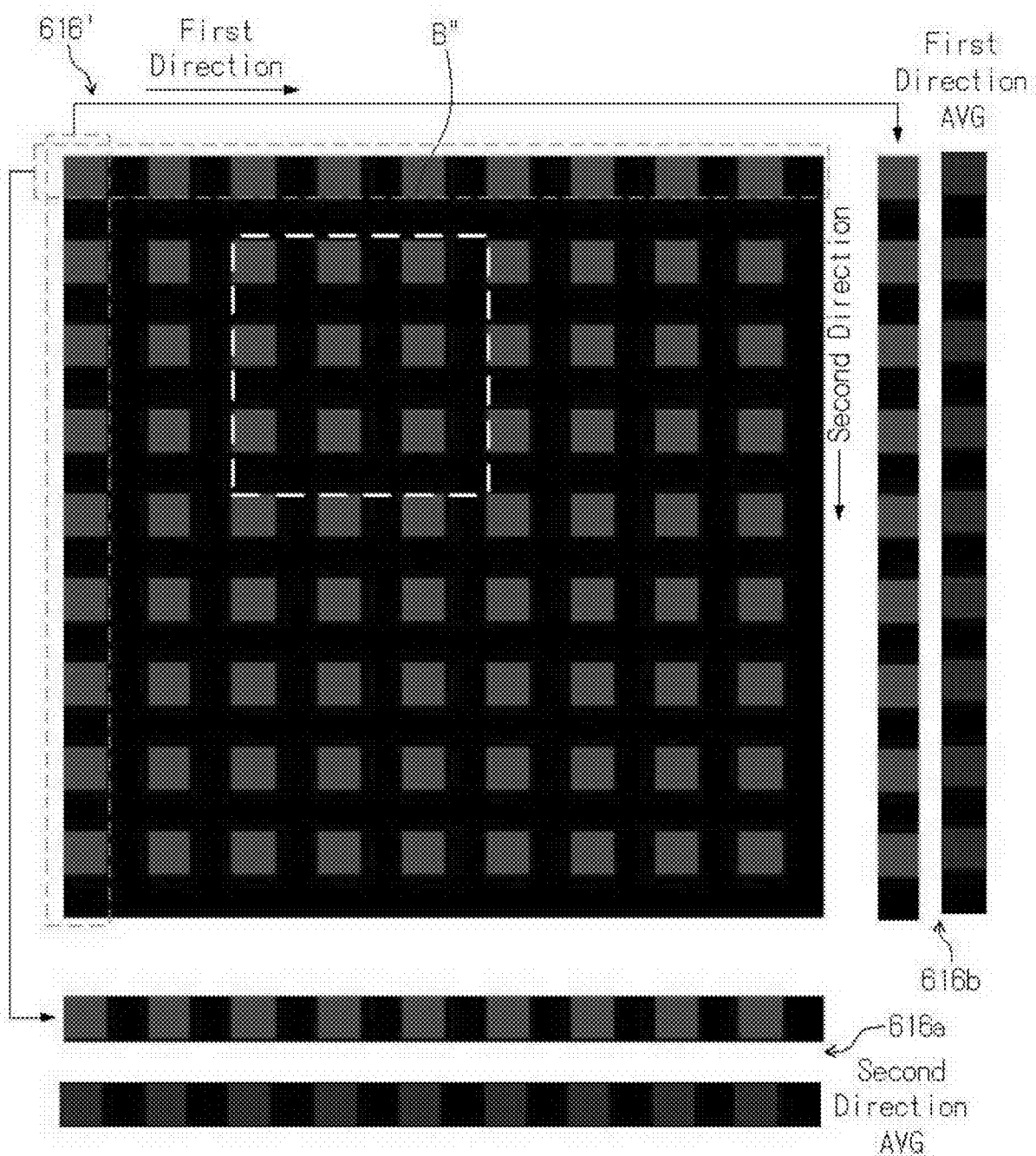
FIG. 25 illustrates a second color image including a two-dimensional incremental position pattern.

FIG. 25 illustrates a second color image including a two-dimensional incremental position pattern.

Figure 26:
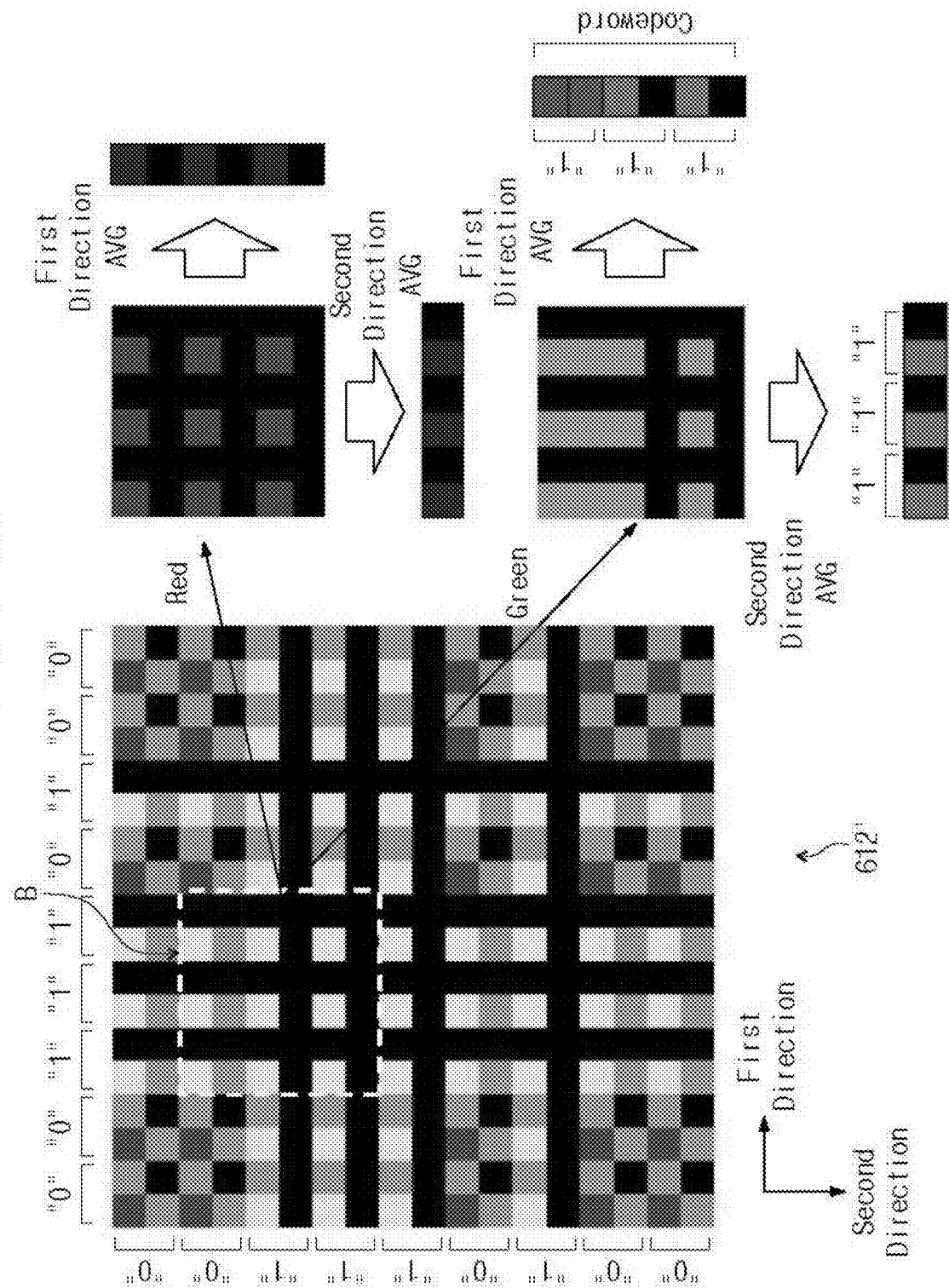
FIG. 26 is a conceptual diagram illustrating a method of decoding a two-dimensional color scale pattern.

FIG. 26 is a conceptual diagram illustrating a method of decoding a two-dimensional color scale pattern.

Referring to FIGS. 20 to 26, a two-dimensional color scale 612 is disposed to represent a binary code using first to fourth symbols 60*a* to 60*d* including 2×2 segments. The first symbol 60*a* represents a first state ("HIGH") in a first direction and a first state ("HIGH") in a second direction. The second symbol 60*b* represents a second state ("LOW") in the first direction and a first state ("HIGH") in the second direction. The third symbol 60*c* represents a first state ("HIGH") in the first direction and a second state ("LOW") in the second direction. The fourth symbol 60*d* represents a second state ("LOW") in the first direction and a second state ("LOW") in the second direction. The first to fourth symbols have a first color (green) and a second color (red), and have different color patterns to each other.

A first segment of a (1,1) coordinate of the first symbol 60a may be a composite color (yellow) of the first color and the second color, a second segment of a (1,2) coordinates may have a black color, a third segment of a (2,1) coordinate of the first symbol 60a may have a black color, and a fourth segment of a (2,2) coordinate of the first symbol 60a may have a black color.

A first segment of a (1,1) coordinate of the second symbol 60b may be a composite color (yellow) of the first color and the second color, a second segment of a (1,2) coordinates of the second symbol 60b may have a first color (green), a third segment of a (2,1) coordinate of the second symbol 60b may have a black color, and a fourth segment of a (2,2) coordinate of the second symbol 60b may have a black color.

A first segment of a (1,1) coordinate of the third symbol 60c may be a composite color (yellow) of the first color and the second color, a second segment of a (1,2) coordinates of the third symbol 60c may have a black color, a third segment of a (2,1) coordinate of the third symbol 60c may have the first color (green), and a fourth segment of a (2,2) coordinate of the third symbol 60c may have a black color.

A first segment of a (1,1) coordinate of the fourth symbol 60d may have a second color (red), a second segment of a (1,2) coordinates of the fourth symbol 60d may have the first color (green), a third segment of a (2,1) coordinate of the fourth symbol 60c may have the first color (green), and a fourth segment of a (2,2) coordinate of the fourth symbol 60d may have a black color. The first color may be one of the three primary colors, and the second color may be another one of the three primary colors.

The first to fourth symbols 60a to 60d may be formed by color composition of light of the absolute position symbols 61a to 61d and the incremental position symbol 62. The absolute position symbols may include 2×2 segments and may include different patterns of the first color.

The first absolute position symbol 61a represents a first state ("HIGH") in the first direction and a first state ("HIGH") in the second direction. The second absolute position symbol 61b represents a second state ("LOW") in the first direction and a first state ("HIGH") in the second direction. The third absolute position symbol 61c represents a first state ("HIGH") in the first direction and a second state ("LOW") in the second direction. The fourth absolute position symbol 61d represents a second state ("LOW") in the first direction and a second state ("LOW") in the second direction. The first to fourth absolute position symbols 61a to 61d have the first color and have different patterns to each other.

A first segment of a (1,1) coordinate of the first absolute position symbol 61a may have the first color (green), a second segment of a (1,2) of the first absolute position symbol 61a may have a black color, a third segment of a (2,1) coordinate of the first absolute position symbol 61a may have a black color, and a fourth segment of a (2,2) coordinate of the first absolute position symbol 61a may have a black color.

A first segment of a (1,1) coordinate of the second absolute position symbol 61b may have the first color (green), a second segment of a (1,2) of the second absolute position symbol 61b may have the first color (green), a third segment of a (2,1) coordinate of the second absolute position symbol 61b may have a black color, and a fourth segment of a (2,2) coordinate of the second absolute position symbol 61b may have a black color.

A first segment of a (1,1) coordinate of the third absolute position symbol 61c may have the first color (green), a second segment of a (1,2) of the third absolute position symbol 61c may have a black color, a third segment of a (2,1) coordinate of the third absolute position symbol 61c may have the first color (green), and a fourth segment of a (2,2) coordinate of the third absolute position symbol 61c may have a black color.

A first segment of a (1,1) coordinate of the fourth absolute position symbol 61d may have a black color, a second segment of a (1,2) of the fourth absolute position symbol 61d may have the first color (green), a third segment of a (2,1) coordinate of the fourth absolute position symbol 61d may have the first color (green), and a fourth segment of a (2,2) coordinate of the fourth absolute position symbol 61d may have a black color.

The incremental position symbol 62 may include 2×2 segments. A first segment of a (1,1) coordinate of the incremental position symbol 62 may have a second color (red), a second segment of a (1,2) coordinate of the incremental position symbol 62 may have a black color, a third segment of a (2,1) coordinate of the incremental position symbol 62 may have a black color, and a fourth segment of a (2,2) coordinate of the incremental position symbol 62 may have a black color.

The first symbol 60 a may be formed by color composition of light of the first absolute position symbol 61 and the incremental position symbol 62. The second symbol 60b may be formed by color composition of light of the second absolute position symbol 61b and the incremental position symbol 62. The third symbol 60c may be formed by color composition of light of the third absolute position symbol 61c and the incremental position symbol 62. The fourth symbol 60d may be formed by color composition of light of the fourth absolute position symbol 61d and the incremental position symbol 62.

The first to fourth symbols 60a to 60d may be arranged in a first direction and a second direction to represent a binary code. The binary code may be a pseudo-random-code. The pseudo-random-code may include 3 bits of codeword. A sequence of the pseudo-random-code may be '001110100' and may include 3 bits of codeword. Each bit of the pseudo-random-code represents a "first state (HIGH)" or a "second state (LOW)".

An arrangement of the first to fourth symbols 60a to 60d may constitute a two-dimensional color scale pattern 612. The two-dimensional color scale pattern 612 may be formed by color composition of a two-dimensional absolute position pattern 614 formed by arranging first to fourth absolute position symbols and an incremental position pattern formed by an incremental position symbol.

The two-dimensional color scale pattern 612 is formed through color composition of a two-dimensional absolute position pattern 614 including black and the first color and a two-dimensional incremental position pattern 616 including black and the second color.

Referring to FIG. 24, a sequence in the first direction may be '001110100', and a sequence in the second direction may be '001110100'. Symbols corresponding to positions corresponding to the respective sequence coordinates are arranged.

After the photo-sensor array 140 captures the two-dimensional color scale pattern 612, a first color channel image 614' including the first color may be generated. Alternatively, the first color channel image 614' may include a portion B' of the two-dimensional absolute position pattern. The portion B' of the first color channel image 614' may include at least one codeword in the first direction and at least one codeword in a second direction to decode an absolute position.

In the first color channel image 614', an absolute position pattern of a single line separately shown on a right side represents a single leftmost line of the two-dimensional color scale pattern. When a signal level of a pattern disposed in the second direction is detected, a codeword in the second direction may be read.

To read a codeword in the second direction, the codeword in the second direction may be obtained by averaging signals in the first direction. That is, the codeword in the second direction may be divided into a first region in which all of 18 segments have a black color, a second region in which nine of 18 segments are the first color (green), and a third region in which fourteen of 18 segments have the first color (green). A combination of the three regions may indicate a "first state (HIGH)" or a "second state (LOW)".

In the first color channel image 614', an absolute position pattern of a single line separately shown on a lower side represents a single line on an uppermost side of the two-dimensional color scale pattern. When a signal level of a pattern disposed in the first direction is detected, a codeword in the first direction may be read.

To read a codeword in the second direction, the codeword in the second direction may be obtained by averaging signals in the first direction. That is, the codeword in the second direction may be divided into a first region in which all of 18 segments have a black color, a second region in which nine of the 18 segments are the first color (green), and a third region in which fourteen of the total 18 segments have the first color (green). A combination of the three regions may indicate a "first state (HIGH)" or a "second state (LOW)".

Referring to FIG. 25, after a photo-sensor array 140 captures a two-dimensional color scale pattern 612, a second color channel image 616' including a second color may be generated.

The incremental position pattern 616 may be disposed in such a manner that the second color (red) and black are alternately aligned in the first direction. The incremental position pattern 616 may be disposed in such a manner that the second color and black are alternately aligned in the second direction.

In the second color channel image 616', an increment position pattern of a single line separately shown on a right side represents a single line on an leftmost side of the two-dimensional color scale pattern. When a signal level of a pattern disposed in the second direction is detected, an incremental code in the second direction may be read.

To read an incremental in the first direction, the incremental code in the first direction may be obtained by averaging signals in the second direction. That is, the incremental code in the second direction may be divided into a first region, in which all of 18 segments have a black color, and a second region in which nine of the 18 segments are the second color (red). A combination of the two regions may indicate a barcode in the first direction or an incremental code in the second direction.

Referring to FIG. 26, a color image shown as region B is shown as a region B' in a first color channel image 614' and a region B" in a second color channel image 616'. In the first color channel image 614', the region B' is determined after codewords in the first direction are averaged in the second direction. In the first color channel image 614', the region B' is determined after codewords in the second direction are averaged in the first direction.

A first absolute position codeword (for example, '111') is read from the first color channel image 614' at a specific position in the first direction to obtain a first approximate absolute position in the first direction. A second absolute position codeword (for example, '011') is read from the first color channel image 614' at the specific position to determine a second approximately absolute position in the second direction. Specifically, a first color channel signal 614a may be generated from the first color channel image 614' in the second direction. The first color channel signal 614a in the first direction may be averaged in the second direction. A codeword of the first absolute position may be read from the first color channel signal 614a in the first direction using a signal level in the first direction at the specific position. A first absolute position value may be calculated using a look-up table corresponding to the codeword of the first absolute position in the first direction. The first approximate absolute position may be calculated using the first absolute position value.

A codeword of a second absolute position may be read from the first color channel image at the specific position using the signal level in the second direction. Specifically, a first color channel signal 614b in the second direction may be generated from the first color channel image 614'. The first color channel signal 614b in the second direction may be obtained through averaging in the first direction. A second absolute position value may be calculated using a look-up table, corresponding to the codeword in the second absolute position, in the second direction. A second approximate absolute position may be calculated using the second absolute position value.

Figure 27:
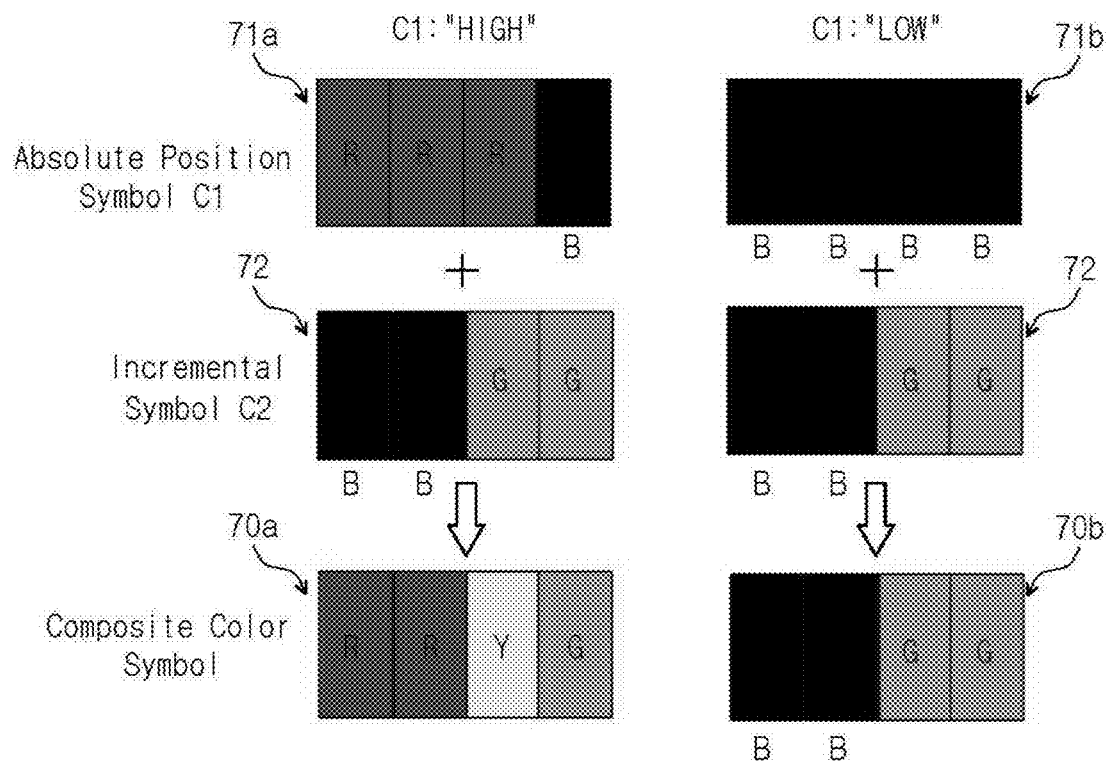
FIGS. 27 and 28 are conceptual diagrams of symbols constituting a color scale according to another example embodiment of the present disclosure.

FIG. 27 is a conceptual diagram of symbols constituting a color scale according to another example embodiment of the present disclosure.

Referring to FIG. 27, a color scale is disposed to represent a binary code using a first symbol 70a, having a first width w and representing a first state ("HIGH"), and a second symbol 70b having the first width w and representing ("LOW"). The first symbol 70a is divided into two or more segments having the same structure. The second symbol 70b is divided into two or more segments of the same structure. The first symbol 70a has the same shape as the second symbol 70b, but may have a color structure different from a color structure of the second symbol 70b.

Each of the first symbol 70a and the second symbol 70b may include four segments. First and second segments of the first symbol 70a have a first color (red), a third segment of the first symbol 70a has a composite color (yellow) of the first color (red) and a second color (green), and a fourth segment of the first symbol 70a may have the second color (green). First and second segments of the second symbol 70b may have a black color, and third and fourth segments of the second symbol 70b may have the second color (green).

Each of the first absolute position symbol 71a and the second absolute position symbol 71b may include four segments. First to third segments of the first absolute position symbol 71a may have a first color (red), and a fourth segment of the first absolute position symbol 71a may have a black color. First to fourth segments of the second absolute position symbol 71b may have a black color.

An incremental position symbol 72 may include four segments. First and second segments of the incremental position symbol 72 may have a black color, and third and fourth segments of the incremental position symbol 72 may have be the second color (green).

The first symbol 70a may be formed by color composition of the first absolute position symbol 71a and the incremental position symbol 72. The second symbol 70b may be formed by color composition of the second absolute position symbol 71b and the incremental position symbol 72.

Figure 28:
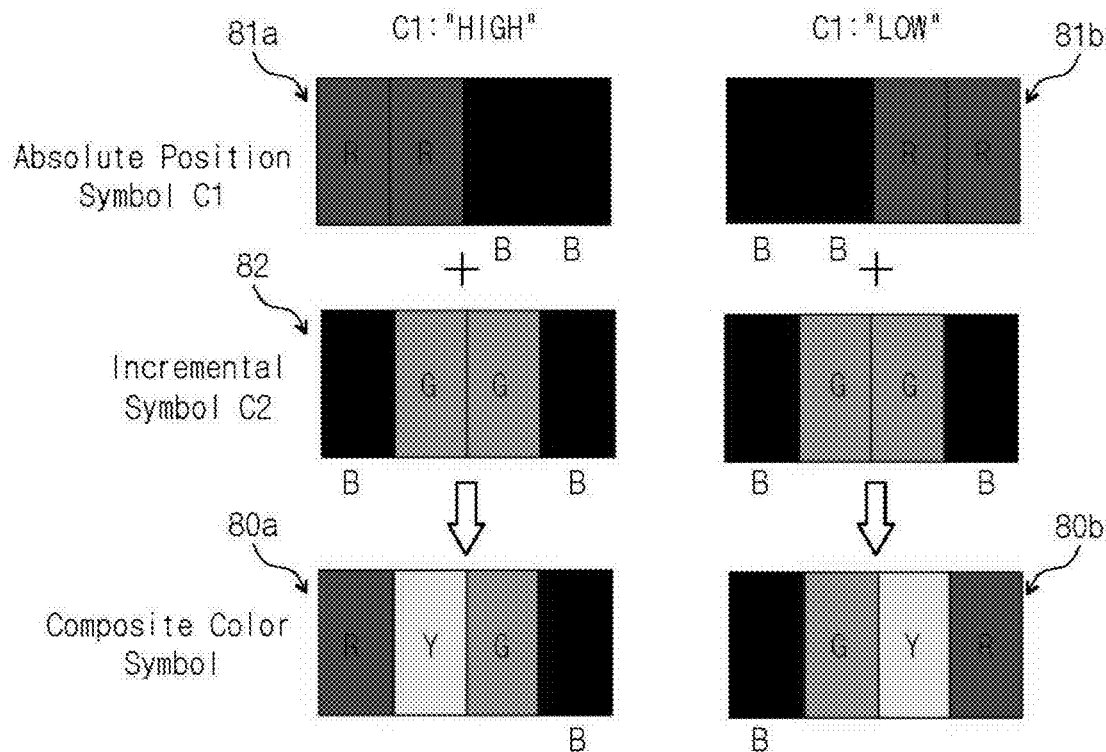

FIG. 28 is a conceptual diagram of symbols constituting a color scale according to another example embodiment of the present disclosure.

Referring to FIG. 28, a color scale is disposed to represent a binary code using a first symbol 80a having a first width w and representing a first state ("HIGH") and a second symbol 80b having the first width w and representing a second state ("LOW"). The first symbol 80a is divided into two or more segments having the same structure. The second symbol 80b is divided into two or more segments having the same structure. The first symbol 80a has the same shape as the second symbol 80b, but may have a color structure different from a color structure of the second symbol 80b.

Each of the first symbol 80a and the second symbol 80b may have four segments. First segment of the first symbol 80a may have a first color (red), a second segment of the first symbol 80a may have a composite color of the first color and the second color, a third segment of symbol 80a may have the second color (green), and a fourth segment of the first symbol 80a may have a black color.

A first segment of the second symbol 80b may have the black color, a second segment of the second symbol 80b may have the second color, a third segment of the second symbol 80b may have a composite color of the first and second color, and a fourth segment of the second symbol 80b may have the first color (red).

Each of the first absolute position symbol 81a and the second absolute position symbol 81b may have four segments. First and second segments of the first absolute position symbol 81a may have the first color (red), and third and fourth segments of the first absolute position symbol 81a may have a black color. First and second segments of the second absolute position symbol 81b may have a black color, and third and fourth segments of the second absolute position symbol 81b may have the first color (red).

The incremental position symbol 82 may have four segments. A first segment of the incremental position symbol 82 may have the black color, second and third segments of the incremental position symbol 82 may have the second color (green), and a fourth segment of the incremental position symbol 82 may have a black color.

The first symbol 80a may be formed by color composition of the first absolute position symbol 81a and the incremental position symbol 82. The second symbol 80b may be formed by color composition of the second absolute position symbol 81b and the incremental position symbol 82.

As described above, a color scale according to an example embodiment of the present disclosure may encode absolute position information, encoded with a black color and a first color, and incremental position information, encoded with the black color and a second color, through color composition.

Additionally, a method of reading a position of a color scale according to an example embodiment of the present disclosure may calculate precise absolute position information by performing decoding with a first color including absolute position information and decoding with a second color having incremental position information and combining the absolute position information and the incremental position information with each other.

Although the present disclosure and its advantages have been described in detail, it should be understood that various changes, substitutions and alterations can be made herein without departing from the spirit and scope of the disclosure as defined by the following claims.

What is claimed is:

1. An absolute position color scale disposed to represent a binary code using a first symbol, having a first width and representing a first state ("HIGH"), and a second symbol having the first width and representing a second state ("LOW"),
   wherein each of the first and second symbols is divided into two or more segments having the same structure, and
   the first symbol has the same shape as the second symbol, but has a color pattern different from a color pattern of the second symbol.

2. The absolute position color scale as set forth in claim 1, wherein the first symbol includes a second segment having a first color,
   the first symbol includes a first segment having a second color,
   the second symbol includes a first segment having the second color, and
   the second symbol includes a second segment having a black color.

3. The absolute position color scale as set forth in claim 1, wherein each of the first and second symbols includes two segments.

4. The absolute position color scale as set forth in claim 1, wherein each of the first and second symbols includes two segments,
   the first symbol includes a first segment having a composite color of a first color and a second color,
   the first symbol includes a second segment having a black color,
   the second symbol includes a first segment having the second color, and
   the second symbol includes a second segment having the first color.

5. The absolute position color scale as set forth in claim 1, wherein each of the first and second symbols includes four segments,
   the first symbol includes first and second segments each having a first color,
   the first symbol includes a third segment having a composite color of the first color and a second color,
   the first symbol includes a fourth segment having the second color,
   the second symbol includes first and second segments each having a black color, and
   the second symbol includes third and fourth segments each having the second color.

6. The absolute position color scale as set forth in claim 1, wherein each of the first and second symbols includes four segments,
   the first symbol includes a first segment having a first color,
   the first symbol includes a second segment having a composite color of the first color and a second color,
   the first symbol includes a third segment having the second color,
   the first symbol includes a fourth segment having a black color,
   the second symbol includes a first segment having the black color,
   the second symbol includes a second segment having the second color, the second symbol includes a third segment having a composite color of the first color and the second color, and the second symbol includes a fourth segment having the first color.

7. An absolute position color scale disposed to represent a binary code using a first symbol, having a first width and representing a first state ("HIGH"), and a second symbol having the first width and representing a second state ("LOW"),
- wherein each of the first and second symbols is divided into two or more segments having the same structure,
- the first symbol is formed by color composition of a first absolute position symbol and an incremental position symbol having the same structure,
- the second symbol is formed by color composition of a second absolute position symbol and the incremental position symbol having the same structure,
- a first absolute position symbol and a second absolute position symbol represent the first state ("HIGH") or the second state ("LOW") using a black color and a first color, and
- the incremental position symbol includes the black color and a second color.

8. The absolute position color scale as set forth in claim 7, wherein each of the first and second symbols includes two segments,
- the first absolute position symbol includes a first segment having the black color,
- the first absolute position symbol includes a second segment having the first color,
- the second absolute position symbol includes a first segment having the black color,
- the second absolute position symbol includes a second segment having the black color,
- the incremental position symbol includes a first segment having the second color, and
- the incremental position symbol includes a second segment having the black color.

9. The absolute position color scale as set forth in claim 7, wherein each of the first and second symbols includes two segments,
- the first absolute position symbol includes a first segment having the first color,
- the first absolute position symbol includes a second segment having the black color,
- the second absolute position symbol includes a first segment having the black color,
- the second absolute position symbol includes a second segment having the first color,
- the incremental position symbol includes a first segment having the second color, and
- the incremental position symbol includes a second segment having the black color.

10. The absolute position color scale as set forth in claim 7, wherein each of the first and second symbols includes four segments,
- the first absolute position symbol includes first to third segments each having the first color,
- the first absolute position symbol include a fourth segment having the first color,
- the second absolute position symbol includes first to fourth segments each having the black color,
- the incremental position symbol includes first and second segments each having the black color, and
- the incremental position symbol includes third and fourth segments each having the second color.

11. The absolute position color scale as set forth in claim 7, wherein each of the first and second symbols includes four segments,
- the first absolute position symbol includes first and second segments each having the first color,
- the first absolute position symbol includes third and fourth segments each having the black color,
- the second absolute position symbol includes first and second segments each having the black color,
- the second absolute position symbol includes third and fourth segments each having the first color,
- the incremental position symbol includes first and fourth segments each having the black color, and
- the incremental position symbol includes second and third segments each having the second color.

12. An absolute position measuring apparatus comprising:
- a color scale disposed to represent a binary code using a first symbol, having a first width and representing a first state ("HIGH"), and a second symbol having the first width and representing a second state ("LOW");
- a light source configured to irradiate a light to the color scale;
- an optical system configured to focus a light passing through the color scale or a light reflected from the color scale;
- a photo-sensor array configured to sense an image of the color scale,
- each of the first and second symbols is divided into two or more segments having the same structure, and
- the first symbol has the same shape as the second symbol, but has a color pattern different from a color pattern of the second symbol.

13. The absolute position measuring apparatus as set forth in claim 12, wherein the optical system comprises:
- an object lens unit configured to irradiate an output light of the light source to the color scale; and
- an image lens unit configured to focus a light, passing through the object lens after being reflected from the color scale, on the photo-sensor array.

14. The absolute position measuring apparatus as set forth in claim 12, further comprising:
- a collimator lens configured to convert a light of the light source into a parallel light; and
- a beam splitter configured to provide a light to the object lens after changing an optical path of the parallel light and to provide the light provided to the object lens unit to the image lens unit.

* * * * *